United States Patent [19]

Anderson et al.

[11] 4,244,019

[45] * Jan. 6, 1981

[54] DATA PROCESSING SYSTEM INCLUDING A PROGRAM-EXECUTING SECONDARY SYSTEM CONTROLLING A PROGRAM-EXECUTING PRIMARY SYSTEM

[75] Inventors: David L. Anderson; Richard L. Bishop, both of Sunnyvale, Calif.

[73] Assignee: Amdahl Corporation, Sunnyvale, Calif.

[ * ] Notice: The portion of the term of this patent subsequent to Apr. 10, 1996, has been disclaimed.

[21] Appl. No.: 920,398

[22] Filed: Jun. 29, 1978

Related U.S. Application Data

[63] Continuation of Ser. No. 693,552, Jun. 7, 1978, Pat. No. 4,149,244.

[51] Int. Cl.³ .............................................. G06F 15/16
[52] U.S. Cl. .................................................. 364/200
[58] Field of Search ............... 364/200, 102; 235/302, 235/302.2, 304, 304.1, 304.2

[56] References Cited

U.S. PATENT DOCUMENTS

| | | | |
|---|---|---|---|
| 3,406,380 | 10/1968 | Bradley et al. | 364/200 |
| 3,560,934 | 2/1971 | Ernst et al. | 364/200 |
| 3,564,502 | 2/1971 | Boehner et al. | 364/200 |
| 3,573,741 | 4/1971 | Gavril | 364/200 |
| 3,585,599 | 6/1971 | Hitt et al. | 364/200 |
| 3,593,299 | 7/1971 | Driscoll et al. | 364/200 |
| 3,614,742 | 10/1971 | Watson et al. | 364/200 |
| 3,634,830 | 1/1972 | Baskin | 364/200 |
| 3,648,252 | 3/1972 | Thron et al. | 364/200 |
| 3,673,576 | 6/1972 | Donaldson, Jr. | 364/200 |
| 3,692,989 | 9/1972 | Kandiew | 364/200 |
| 3,812,469 | 5/1974 | Hauck et al. | 364/200 |
| 3,825,901 | 7/1974 | Golnek, Sr. et al. | 364/200 |
| 3,831,148 | 8/1974 | Greenwald et al. | 364/200 |
| 3,882,305 | 5/1975 | Johnstone | 364/200 |
| 3,934,232 | 1/1976 | Curley et al. | 364/200 |
| 3,940,743 | 2/1976 | Fitzgerald | 364/200 |
| 3,976,979 | 8/1976 | Parkinson et al. | 364/200 |
| 4,004,277 | 1/1977 | Gavril | 364/200 |
| 4,014,005 | 3/1977 | Fox et al. | 364/200 |
| 4,041,471 | 8/1977 | Krossa et al. | 364/200 |
| 4,057,847 | 11/1977 | Lowell et al. | 364/200 |

*Primary Examiner*—Raulfe B. Zache
*Attorney, Agent, or Firm*—David E. Lovejoy

[57] ABSTRACT

Disclosed is a primary data processing system comprised of, for example, a main store, a storage unit, an instruction unit, an execution unit, a console unit and a channel unit for performing primary system programs. The console unit includes a secondary digital computer for performing secondary programs which functions to observe and/or alter the primary system. The functions performable by the secondary system include altering the primary system control state, causing primary commands to be executed, controlling primary data and addresses, and scanning out primary information. The console is connected through a command bus, an address bus and a data bus to the controls and data paths of the channel unit, of the instruction unit and of the storage unit.

9 Claims, 9 Drawing Figures

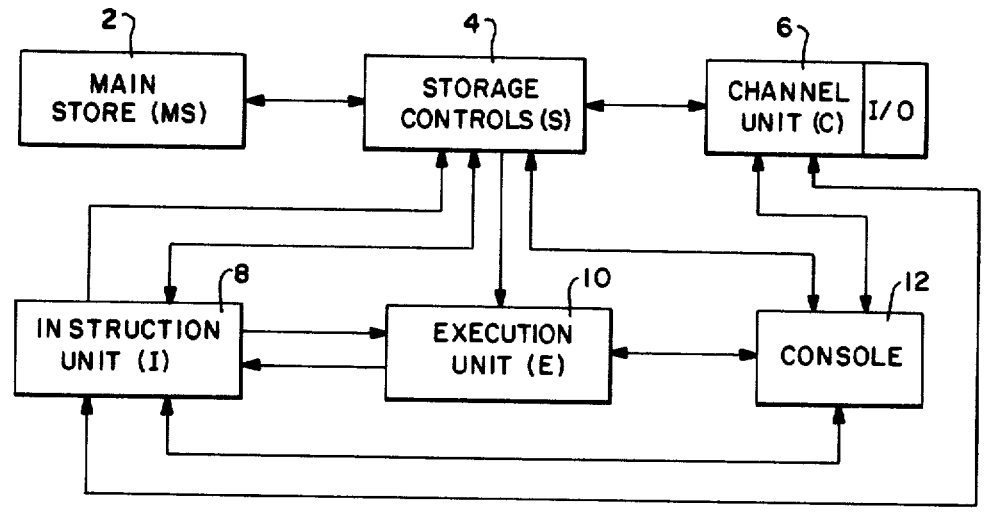
FIG.—1
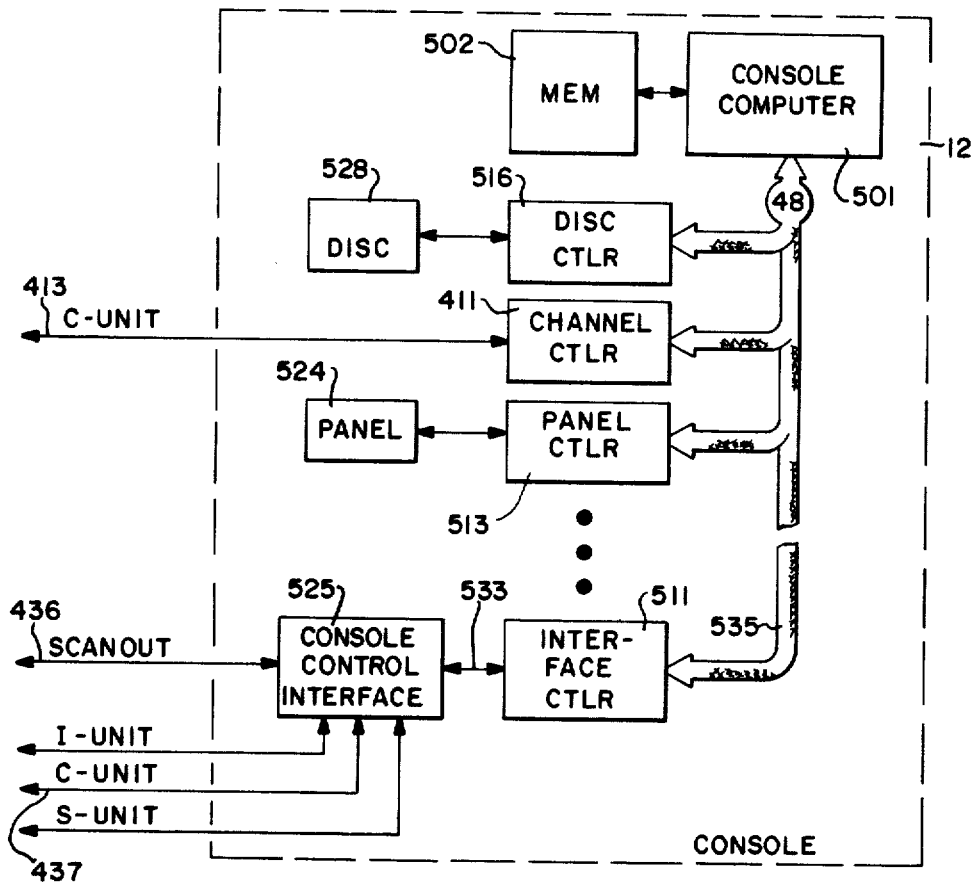
FIG.—2

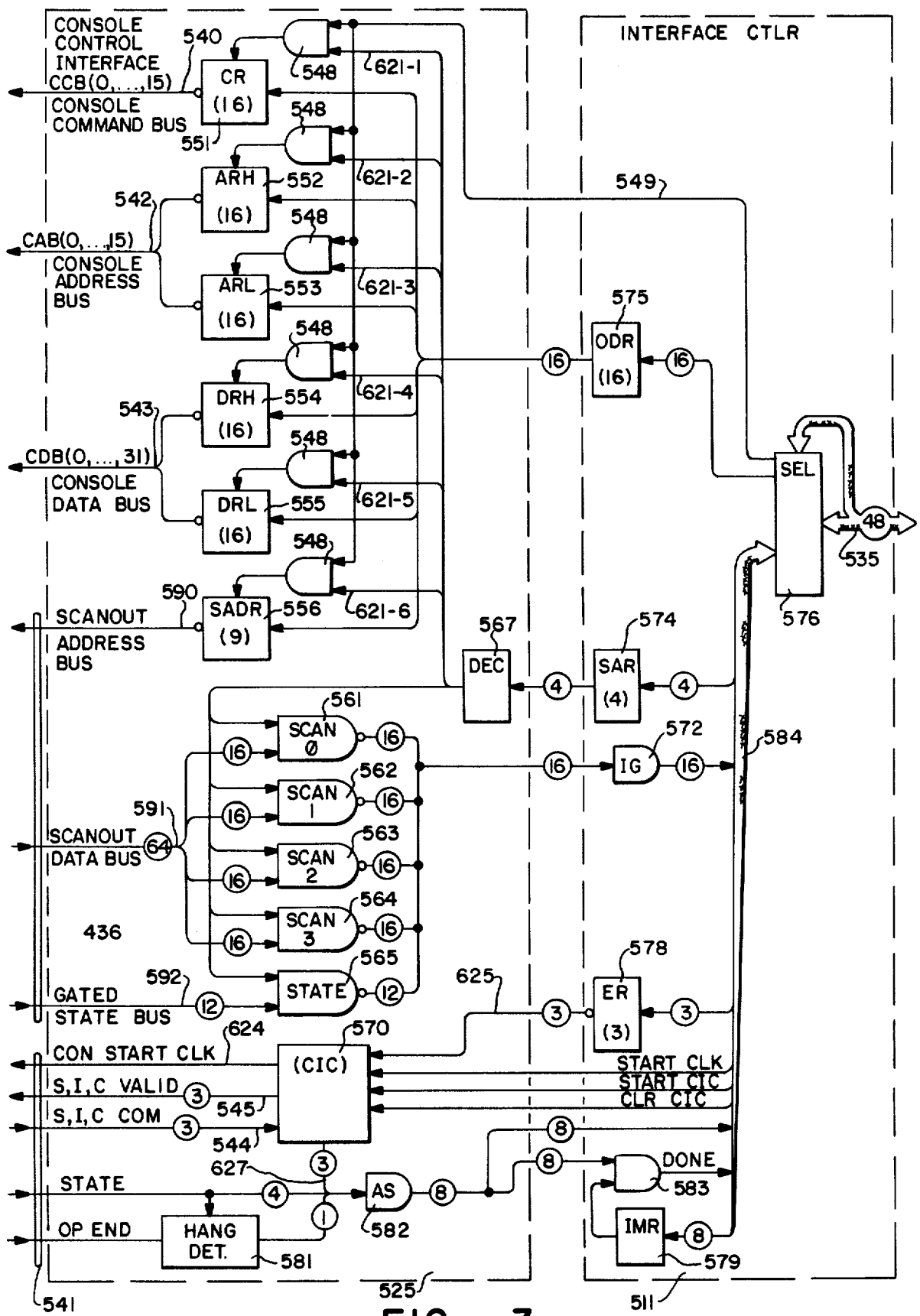
FIG.—3

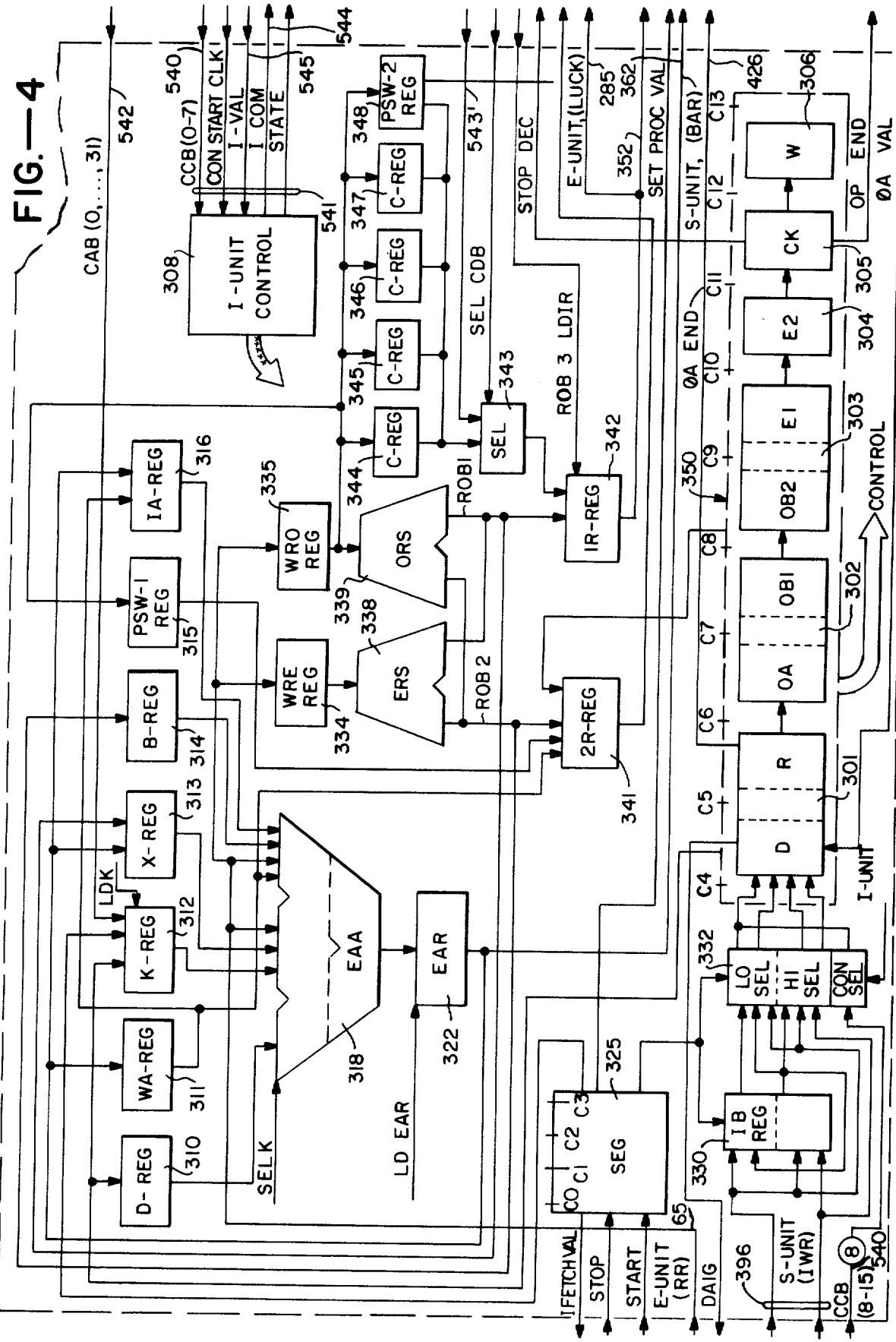
FIG.—4

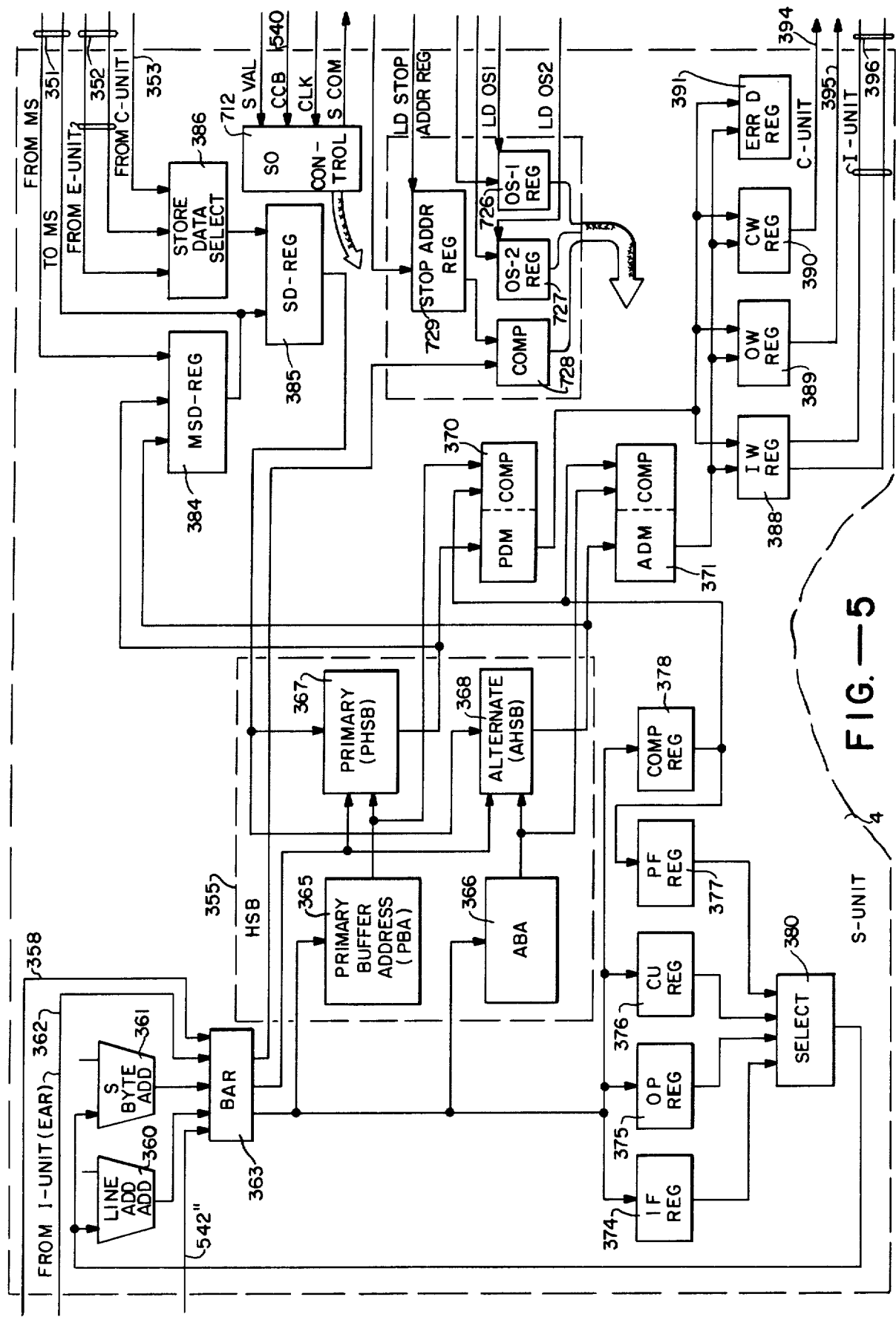
FIG.—5

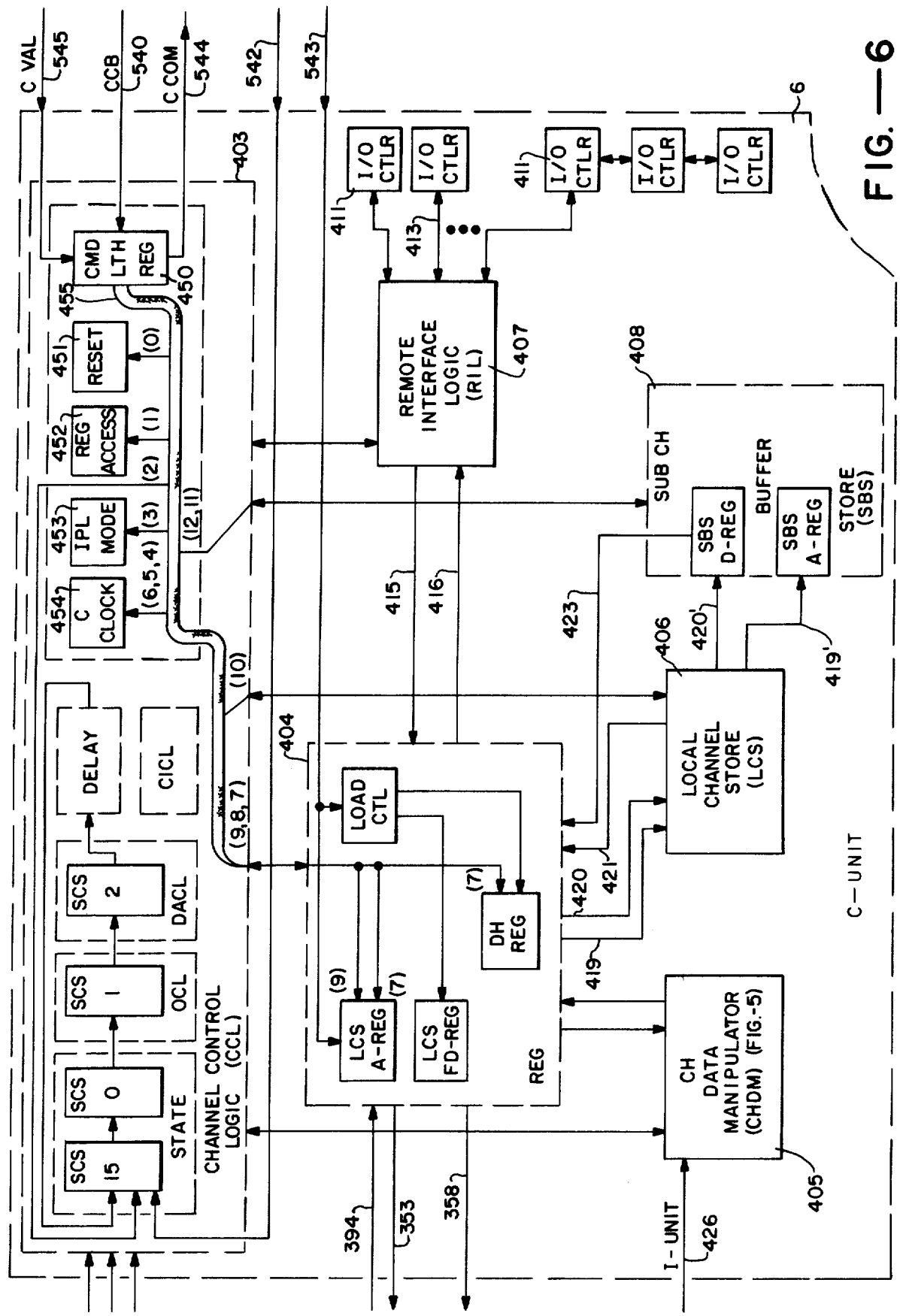
FIG.—6

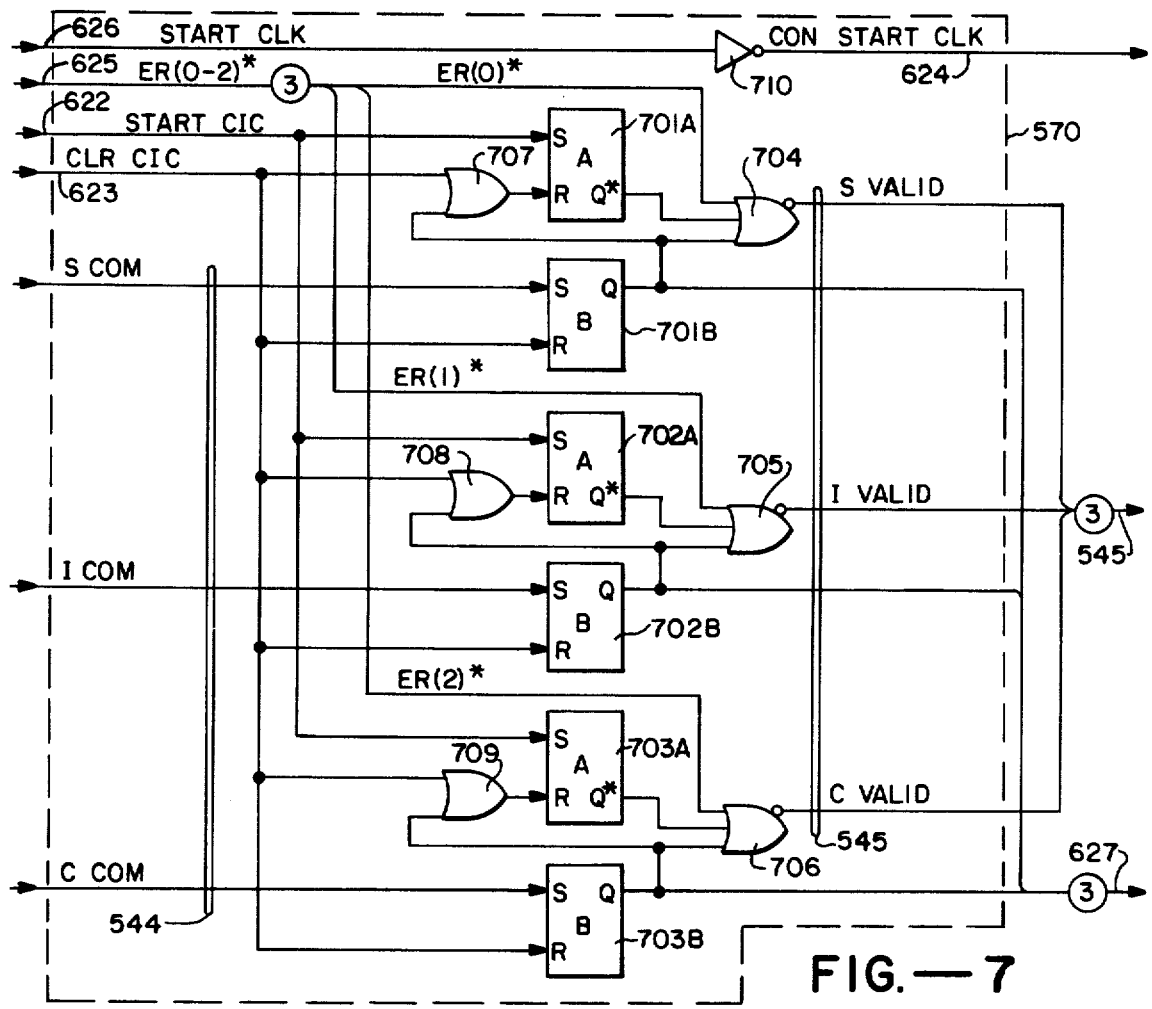
FIG.—7
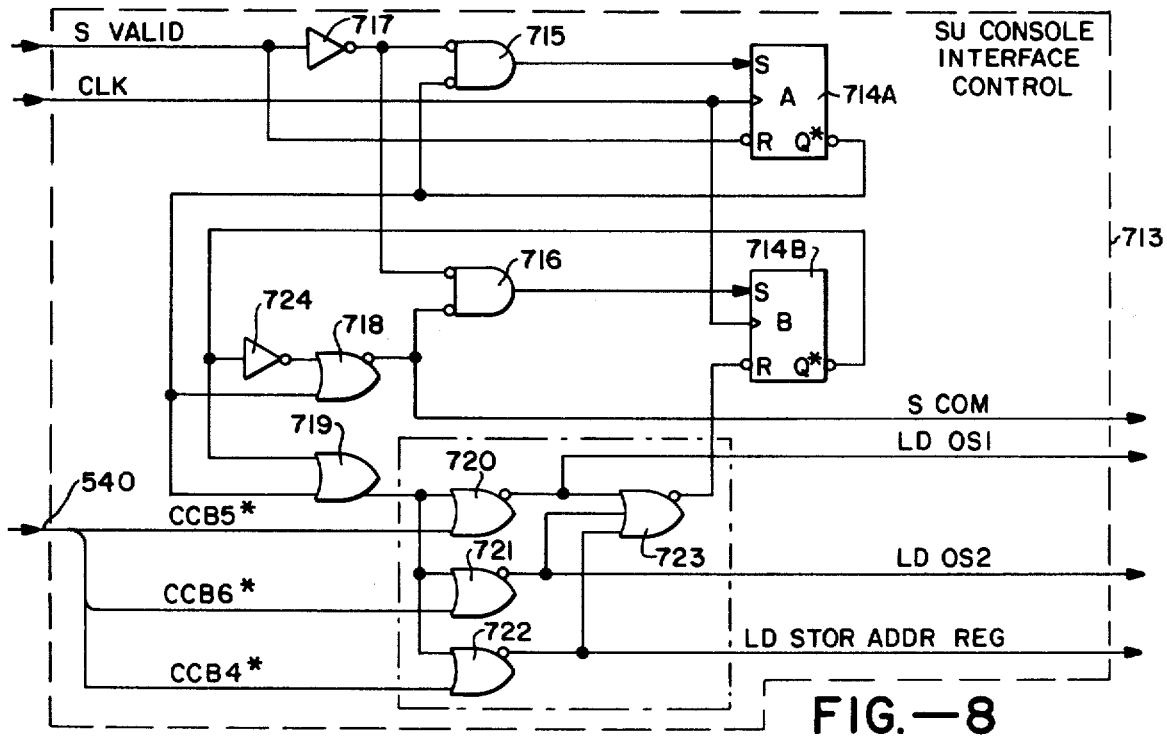
FIG.—8

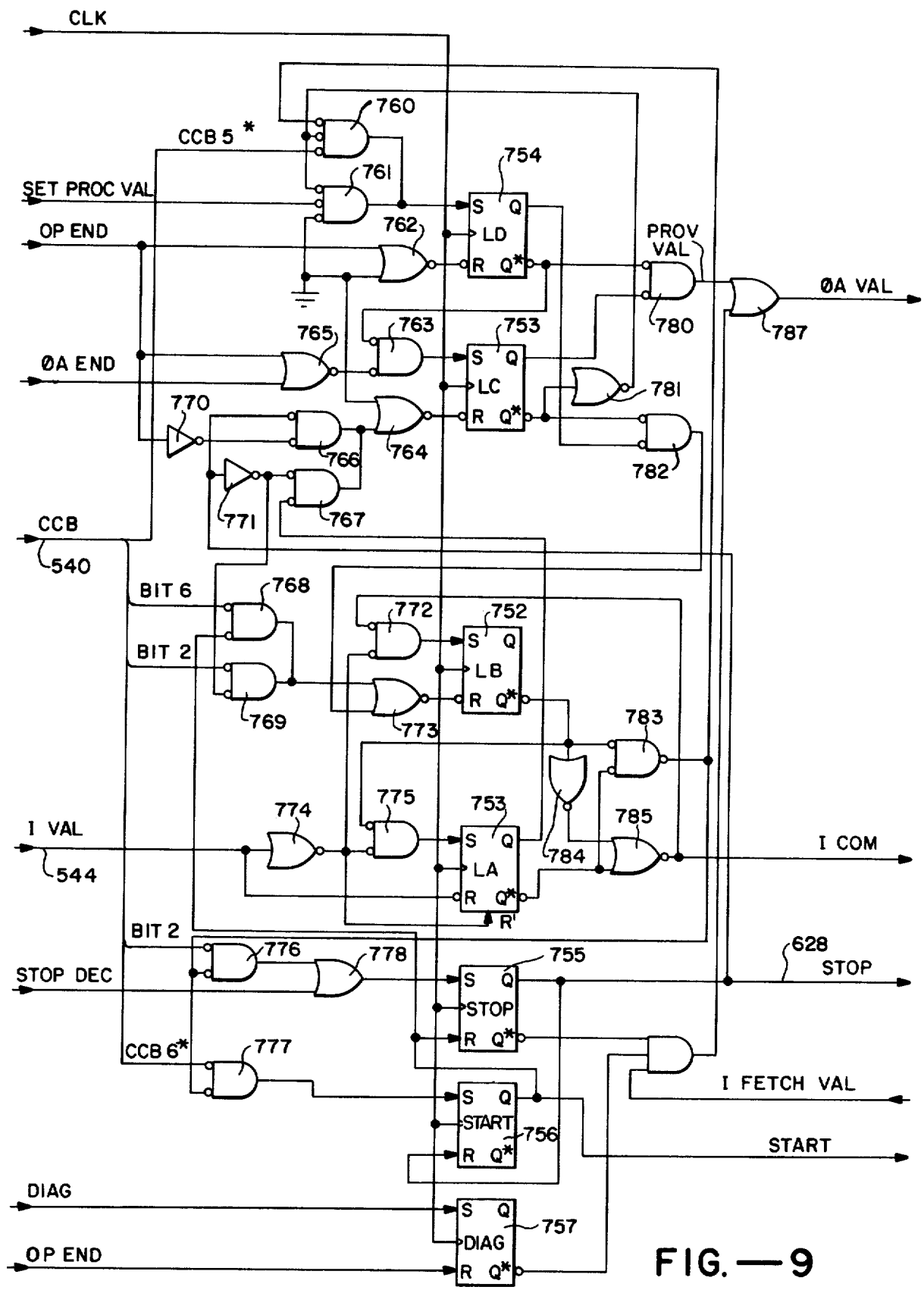
FIG.—9

DATA PROCESSING SYSTEM INCLUDING A PROGRAM-EXECUTING SECONDARY SYSTEM CONTROLLING A PROGRAM-EXECUTING PRIMARY SYSTEM

This is a continuation, of application Ser. No. 693,552 filed June 7, 1978, now U.S. Pat. No. 4,149,244.

CROSS REFERENCE TO RELATED APPLICATIONS

1. DATA PROCESSING SYSTEM, Ser. No. 302,221, filed Oct. 30, 1972, invented by Gene M. Amdahl, Glenn D. Grant, and Robert M. Maier, assigned to Amdahl Corporation, U.S. Pat. No. 3,840,861, issued Oct. 8, 1974.

2. DATA PROCESSING SYSTEM AND INFORMATION SCANOUT, Ser. No. 693,551, filed June 7, 1976, invented by David L. Anderson and Richard L. Bishop, assigned to Amdahl Corporation abandoned in favor of U.S. Ser. No. 059,870, filed July 23, 1979.

3. CLOCK APPARATUS AND DATA PROCESSING SYSTEM, Ser. No. 302,222, filed Oct. 30, 1972, invented by Glenn D. Grant, assigned to Amdahl Corporation, U.S. Pat. No. 3,792,362, issued Feb. 12, 1974.

4. DUAL OUTPUT ADDER AND METHOD OF ADDITION, Ser. No. 302,225, filed Oct. 30, 1972, invented by Ulrich Spannagel, assigned to Amdahl Corporation, U.S. Pat. No. 3,814,925, issued June 4, 1974.

5. LSI CHIP CONSTRUCTION AND METHOD, Ser. No. 270,449, filed July 10, 1972, invented by Fred K. Buelow and John J. Zasio, assigned to Amdahl Corporation, U.S. Pat. No. 3,808,475, issued Apr. 30, 1974.

6. LSI CHIP CONSTRUCTION AND METHOD, Ser. No. 348,219, filed Apr. 5, 1973, invented by Fred K. Buelow and John J. Zasio, assigned to Amdahl Corporation abandoned in favor of U.S. Ser. No. 491,237, filed July 24, 1974, now U.S. Pat. No. 3,981,070, issued Apr. 21, 1976.

7. LSI CHIP PACKAGE AND METHOD, Ser. No. 270,448, filed July 10, 1972, invented by Robert J. Beall and John J. Zasio, assigned to Amdahl Corporation abandoned in favor of U.S. Ser. No. 534,853, filed Dec. 20, 1974, now U.S. Pat. No. 4,115,837, issued Sept. 19, 1978.

8. LSI CHIP PACKAGE AND METHOD, Ser. No. 348,239, filed Apr. 5, 1973, invented by Robert J. Beall and John J. Zasio, assigned to Amdahl Corporation. Now U.S. Pat. No. 3,872,583, issued Mar. 25, 1975.

9. HIGH DENSITY MULTILAYER PRINTED CIRCUIT BOARD AND METHOD, Ser. No. 407,181, filed Oct. 17, 1973, invented by Fred K. Buelow, Robert J. Beall and John J. Zasio, assigned to Amdahl Corporation. Now U.S. Pat. No. 4,016,463, issued Apr. 5, 1977.

BACKGROUND OF THE INVENTION

The present invention relates to the field of instruction-controlled digital computers and specifically to methods and apparatus whereby the console communicates with the remainder of the data processing system.

In data processing systems, control functions are typically implemented in terms of a fixed sequence of instructions called a program where the instructions are sequentially fetched from storage, are decoded and are executed to carry out desired data manipulations.

While some prior art systems have provided techniques for interrupting the operation of the data processing system by human intervention, for maintenance, or other reasons, such interruption techniques have not provided the flexibility which is desirable for a more efficient use of data processing systems.

SUMMARY OF THE INVENTION

The present invention is a data processing system which has instruction execution and processing apparatus which is operable to execute instructions in accordance with the instruction program of the principal operating system and which is also capable of executing instructions specified by a second operating system. In a preferred embodiment of the system the second operating system (secondary system) is in a console which is capable, through its own programmable digital computer, to cause the execution of instructions and commands in the principal data processing system (primary system). In accordance with another aspect of the present invention, the console is also interconnected to the principal system through a channel and a controller as an I/O device.

In a specific embodiment of the present invention, the secondary digital computer connects through a command bus, an address bus, and a data bus to the principal system.

The functions performable by the secondary system include altering the primary system control state, causing primary commands to be executed, controlling primary data and addresses, and scanning out primary information.

In accordance with the present invention, the data processing system in the execution of a principal program in the principal system is interrupted by the secondary program within the secondary system to alter the execution of the principal program in accordance with the secondary program.

In accordance with the above summary, the objective of providing a data processing system in which instruction processing within a principal instruction processing stream is responsive to the execution of instructions in an alternate or secondary instruction processing stream has been provided.

Additional objects and features of the invention will appear from the following description in which the preferred embodiments of the invention have been set forth in detail in conjunction with the drawings.

BRIEF DESCRIPTION OF THE DRAWINGS

FIG. 1 depicts a block diagram of the overall data processing system of the present invention.

FIG. 2 depicts a schematic representation of the console unit of the system of FIG. 1.

FIG. 3 depicts a schematic representation of the interface controller and the console control interface within the console unit of FIG. 2.

FIG. 4 depicts a schematic representation of the instruction unit of the data processing system of FIG. 1 and the manner in which it interconnects with the console of FIG. 2.

FIG. 5 depicts a schematic representation of the storage unit of the data processing system of FIG. 1 and the manner in which it interconnects with the console of FIG. 2.

FIG. 6 depicts a schematic representation of the channel unit of the data processing system of FIG. 1 and the manner in which it interconnects with the console of FIG. 2.

FIG. 7 depicts the console interface control (CIC) within the console control interface of FIG. 3.

FIG. 8 depicts the SU console interface control (SU CIC) which is part of the storage unit of FIG. 5.

FIG. 9 depicts the IU console interface control (IU CIC) which is part of the instruction unit of FIG. 4.

DETAILED DESCRIPTION

Overall System

In FIG. 1, the data processing system of the present invention is shown to include a main store 2, a storage control unit 4, an instruction unit 8, an execution unit 10, a channel unit 6 with associated I/O and a console unit 12. The system of FIG. 1 operates under control of system instructions where an organized group of those instructions forms a system program. System instructions and the data upon which the instructions operate are introduced from the I/O equipment via the channel unit 6 through the storage control unit 4 into the main store 2. From the main store 2, system instructions and data are fetched by the instruction unit 8 through the storage control 4 and are processed so as to control the execution within the exeuction unit 10. The system of FIG. 1 is described in more detail in the above cross-referenced applications.

Console Unit

In FIG. 2, the console unit 12 of FIG. 1 is shown in further detail. Console 12 includes a digital computer 501 which is interconnected with a memory 502 in a conventional manner. The digital computer 501 is connected to a plurality of controllers including a disc controller 516, a channel controller 411, a panel controller 513 and an interface controller 511. Additional controllers may be connected to the computer 501 in a conventional manner.

The disc controller 516 interfaces between the computer 501 and a disc file system 528. The channel controller 411 is one of the channel controllers associated with the channel unit 6 of FIGS. 1 and 6.

The panel controller 513 interfaces between the digital computer 501 and the control panel 524.

The interface controller 511 interfaces between the console control interface 525 and the digital computer 501.

The computer 501 is typically a Nova 1200 computer marketed by Data General Corporation. The details of operation of such a computer and the manner in which control units such as the controllers 411, 511, 513 and 516 of FIG. 2 interface with the computer 501 are described in the publication entitled, "How to use the Nova Computers", DG NM-5, Data General Corporation, April, 1971.

The interface controller 511, connected to the digital computer 501 by the 48-bit bus 535, connects to the console control interface by the bus 533. The console control interface (CCI) 525 is connected via a scanout bus 436 to latch storage circuits and other circuits throughout the data processing system of FIG. 1. The I-unit, C-unit, S-unit interconnections from and to the console control interface 525 are further described hereinafter.

Console Control Interface and Interface Controller

In FIG. 3, the console control interface 525 and the interface controller 511 and their interconnections are shown in further detail. The console control interface (CCI) 525 includes a 16-bit command register (CR) 551 having a 16-bit command bus (CCB) 540 which connects as an input to the I-unit and C-unit as hereinafter described. Bus 540 has bits CCB(0, . . . ,15). Interface 525 further includes 16-bit addressing registers 552 and 553 which form the 32-bit output console address bus (CAB) 542 which interconnects with address paths in the I-unit and S-unit of the data processing system. Bus 542 has bits CAB (0, . . . ,15).

Interface 525 further includes 16-bit data registers 554 and 555 having outputs forming the 32-bit console data bus (CDB) 543 which functions as a console data input to the data paths in the C-unit, S-unit and I-unit of the data processing system of FIG. 1. Bus 543 has bits CDB (0, . . . ,31).

The console registers 551 through 556 and the gates 561 through 565 are addressed by the decoded outputs from the decoder 567 which decodes and selects one of those eleven entities in response to the address in the 4-bit select address register 574 within the interface controller 511.

Interface 525 additionally includes a 9-bit scanout address register 556 which specifies, via 9-bit scanout address bus (SAB) 590, circuits within the data processing system which are to be scanned out. Bus 590 includes bits SAB (0, . . . ,8). Further details as to the scanout apparatus and operation are described in the above-identified application DATA PROCESSING SYSTEM AND INFORMATION SCANOUT.

Interface 525 further includes the 64-bit scanout data bus (SDB) 591 which is connected to scan gates 561 through 564, each 16-bits wide. The 12-bit wide state gates 565 receive the gated state bus (GSB) 592.

When one of the gates 561 through 565 is selected by the decoder 567, scanout information is provided through ingates (IG) 572 to the console computer 501 via selection circuit 576 and bus 535.

Interface 525 additionally includes the console interface control (CIC) 570 which includes logic circuitry establishing outputs in response to inputs. Specifically, the START CLK line functions to enable clock signals in the I-unit and throughout the system of FIG. 1. The S, I and C VALID lines, one for each of the S, I and C units, respectively, form the 3-bit bus 545 which functions to signal when one or more of the respective selected units is to be energized to receive commands from the console unit. When the respective S, I and C units have received a VALID signal, they signify receipt of that signal via the S, I and C COMP lines (which form the 3-bit bus 544), one for each of the units S, I and C, respectively. The 4-bit STATE bus 628 carries signals for indicating states of the principal data processing system. Three of the lines in 4-bit bus 628 function to signify when a system STOP signal, a PSW WAIT signal, a CHECK STOP signal, respectively, occurs in the system of FIG. 1. The fourth line is reserved for other control signals not important for the present invention.

The OP END line carries a control signal for indicating when an operation within the pipeline 350 of FIG. 4 has reached that last stage, the W stage. If the delay between successive OP END signals exceeds a fixed duration, and the system is not in STOP, PSW WAIT or CHECK STOP, an error condition exists in the system of FIG. 1. The OP END line is input to a hang detect circuit 581. Circuit 581 senses the transpired time duration since the last received OP END signal and produces an output error signal to active state gates 582 if the next OP END signal does not occur before the fixed duration. The circuit 581 is a free-running counter which is reset by each OP END signal. If an OP END does not occur before a carry out, or error signal is generated, the STOP PSW WAIT, and CHECK STOP signals hold the counter reset.

The control 570, the hang detect circuit 581, and the state bus 628 are connected by the active state (AS) gates 582 via the lines 584 to the select circuits 576. Gates 583 sense the 8-bit active state gates 582 in combination with the 8-bit interruption mask register (IMR) 579. The gates 582 and the register 579 have a one-for-one bit correlation which is for bits 0, 1, . . . ,7 the commands S COMP, I COMP, C COMP, STOP, PSW WAIT, CHECK STOP STATE, HANG DETECTOR, METERING, respectively.

The interrupt Mask register 579 controls the settings of the 1-bit DONE line connecting from gate 583 to bus 584. There is a one-for-one correspondence between the bits in register 579 and the bits in the active state gates 582, the activization of a bit in the active state gate sets the DONE line if the corresponding bit in the register 579 is not set. If the corresponding bit in register 579 is set, then the DONE line output from gate 583 is not set.

The enable register 578 stores three bits of information which define which one or ones of the S, I and C VALID lines 545 are to be energized. Bit 0 signifies selection of the S-unit, bit 1 the selection of the I-unit, and bit 2 the selection of the C-unit.

The CIC 570 is responsive to an input START CLK line which also causes energization of the output CON START CLK line. Additionally, the START CIC input line from bus 584 initiates operation of the control circuitry 570. The input CLEAR CIC line from bus 584 functions to clear the CIC logic circuit 570 in anticipation of a new command for the FIG. 1 system from the computer 501.

In FIG. 7, further details of the console interface control (CIC) 570 are shown. The input START line 626 for the bus 584 is powered through gate 710 to form the CON START line 624.

The control 570 includes three pairs of latches 701, 702 and 703 associated with the S-unit, the I-unit, and the C-unit, respectively.

The S-unit latches includes the latch 701A and the latch 701B. The I-unit latches include the latch 702A and the latch 702B. The C-unit latches include the latch 703A and the latch 703B. All of the latches are conventional having a set (S) and a reset (R) input. Similarly each latch has a Q output and a complementary Q* output.

The START CIC line 622 connects to the S input of the latches 701A, 702A and 703A. Each of the latches 701A, 702A, and 703A has its R input connected to an OR gate 707, 708, and 709, respectively. Each of the OR gates 707, 708, and 709 receives the CLR CIC line 623. The other input to the OR gates 707, 708 and 709 is from the Q output of the latches 701B, 702B, and 703B, respectively. The S input for latches 701B, 702B and 703B are the S COM, I COM, and C COM lines, respectively. The R input for the latches 701B, 702B, and 703B are connected directly to the CLR CIC line. Each of the pairs of latches 701, 702, and 703 is associated with an output NOR gate 704, 705 and 706, respectively. The NOR gate 704 receives the Q* output from latch 701A and the Q output from latch 701B. Gate 704 has a third input which is the ER(O)* line from the bus 625.

The output from NOR gate 704 is the S VALID line.

The NOR gate 705 receives the ER(1)* line, the Q* output from 703A and the Q output from latch 703B. Gate 706 provides the C VALID output line. The S VALID, the I VALID, and C VALID lines form a 3-bit bus 545.

The Q outputs from each of the latches 701B, 702B and 703B form the three-bit bus 627.

The operation of the FIG. 7 circuit is as follows. All of the latches are cleared with a signal on the CLR CIC line. Thereafter a signal on the START CIC line sets the latches 701A, 702A, and 703A. At this time, whichever one of the bits ER(O-2) is a logical 0 causes the respective NOR gate 704, 705 or 706 to be selected. For example, if ER(1)* is a logical 0 then the I VALID is a logical 1. That signal is transmitted to the I-unit to cause some operation to occur in the I-unit. When the I-unit has completed the operation the I COM line returns a logical 1 and causes the flip-flop 702B to be set. The 1 on the Q output of latch 702B causes NOR gate 705 to be disabled causing the I VALID line to go to 0. The S-unit latches 701 and the C-unit latches 703 function in that same manner described in connection with the latch 702.

Instruction Unit

In FIG. 4, the instruction (I) unit 8 of FIG. 1 is shown in detail. The I-unit 8 includes a plurality of addressing registers. The addressing registers include the 32-bit D register 310 for storing the displacement D1 or D2 obtained from the various instruction fields, the 32-bit WA register 311 for storing a working address, the 32-bit K register 312 for storing an address constant K, the 32-bit X register 313 for storing the X1 or X2 field of the instruction, the 32-bit B register 314 for storing the contents of the register identified by the B field, and a 24-bit register 316 for storing the instruction in storage address. The K register 312 is loaded with the contents of the 32-bit console address bus CAB (0, . . . ,31) 542 under control of the LD K signal. The LD K signal is generated by a decode of certain instructions (e.g. STORE STORAGE) in the R stage in 301 of pipeline 350. When the decode occurs, LD K is generated at C6 time.

During the initial instruction fetching sequence, the LA register 316 stores bit 40 through 63 of the 64-bit PROGRAM STATUS WORD (PSW). Bits 32 through 39 of the PSW are stored in th PSW-1 register 315. Bits 0 through 31 of the PSW are stored in the PSW-2 register 348.

The addressing registers are connected with inputs to the effective address adder 318 which functions to add selected ones of the contents of the addressing registers to form an effective address which is input to the effective address register (EAR) 322. For example, the selection of the contents of the K register 312 is under control of the SEL K line which performs in gating for adder 318. The SEL K signal is generated along the LD EAR signal at C7 times as a result of a decode of certain instructions (e.g. DIAGNOSE) in the OA segment of stage 302. The signal LD EAR latches the output from adder 318 into register 322.

The effective address stored in the register 322, in addition to providing inputs back into the addressing registers, is connected as an input to the storage control unit 4 and specifically, to the buffer address register (BAR) 363 via bus 362. From the register 363, the effective address addresses the high speed buffer (HSB) 355 to access the desired instruction. The accessed instruction is one word in length and is stored in the IW register 388 from where it is gated into the instruction buffer IB register 330 or directly via the selection gates 332 into the instruction pipeline 350.

For use in generating the appropriate addresses and loading the addressing registers and for storing operands and other information, the I-unit 8 includes an even register stack (ERS) 338 and an odd register stack (ORS) 339. Each of the stacks 338 and 339 includes four 32-bit scratch pad registers, and eight 32-bit general purpose registers for a total of eight scratch pad registers and sixteen general purpose registers. Additionally, the even and odd stacks 338 and 339 each include four 32-bit registers which together define four 64-bit floating point registers. The outputs from each of the registers in the stacks 338 and 339 are connected via appropriate gates to readout bus ROB1 and to readout bus ROB2. Bus ROB1 is connected as an input to the IR register 342 and bus ROB2 is connected as an input to the 2R register 341. The 1R register 342 and the 2R register 341 have their outputs connected via buses 285 and 286 to the execution unit 10 as inputs to the LUCK 20 and the 1R register also has its output connected to the storage control unit 4 via bus 352 as an input to the store data select gates 386. The buses ROB1 and ROB2 from the register stacks 338 and 339 also serve as inputs to the addressing registers. In order to gate information into the registers of the stacks 338 and 339, the result register RR in the execution 10 connects as an input to the write even WRE register 334 and the write odd WRO register 335, which connect as inputs to the even register stack 338 and the odd register stack 339, respectively. Additionally, the write odd register 335 has its output connected as an input to the control registers 344 through 348.

The output from the control registers 344 through 348 pass through selection gates 343 the output of which is the readout bus ROB3 which in turn is connected as an input to the IR register 342. The register 344 through 348 provide a means whereby the control functions generally derived from the pipeline 350 insert their control conditions into the data stream of the data processing system.

The instruction fetch and the instruction presentation portions of the instruction sequence are segments PFO, IA, IB1 and IB2. The initial sequence processing is carried out under the control of the sequencer 325 in FIG. 3. The sequencer 325 controls the sequential instruction fetching, determines the next sequential instruction and determines the target instruction fetching. After the prefetch offset (PFO), the sequential instruction fetching processing of sequencer 325 is in one of four states, the IA state, the IB1 state, the interlock state, or the wait state. The states are determined by logical determinations responsive to priority and other control signals in the data processing system.

The next sequential instruction selection is carried out by the sequencer 325 to select whether the next instruction inserted into the pipeline 350 is obtained from the instruction word IW register 388, from the S-unit of FIG. 5, or whether the next instruction is derived from the instruction buffer IB register 330. The determination by sequencer 325 of which instruction is the next to be gated into the pipeline 350 is responsive under usual conditions to various control signals generated throughout the data processing system. Sequencer 325 operates only when an enable signal occurs on the START line and no inhibit signal occurs on the STOP line.

The target fetch (TF) determines which instruction is to be gated into the IW or IB registers as a candidate for the next instruction to be gated into the instruction pipeline 350. The target fetch is responsive to various control signals generated throughout the data processing system.

The logic circuitry for controlling the states in sequencer 325 are implemented using standard data processing techniques. For example, the sequencer is typically a serial counter, enabled by the START line and inhibited by the STOP line, which determines that instructions are fetched in a sequential counting order until the ordered sequence is interrupted, for example, by a branch instruction. Such techniques are well-known in the data processing field.

The initial segments PFO, IA, IB1, IB2 of the instruction sequence are processed under control of the sequencer 325 in FIG. 3. Sequencer 325 operates over the cycles C0, C1, C2 and C3. The prefetch offset segment PFO is carried out during time C0 to C1 which is one clock period and one cycle of the data processing system. During the PFO segment, the IA register 316 is loaded with an incremented address while the other registers 310 through 315 are available to be appropriately loaded and latched at time C1 under typical operation.

During the address formation, IA segment, the registers 310 through 316 are appropriately gated into the effective address adder EAA 318 through conventional in gates (not shown) and selection control lines (not shown) from sequencer 325. Adder 318 adds up to three inputs to form an effective address which is gated into the effective address register EAR 322 where that address is latched under typical operations at time C2. During the instruction buffering segment IB1, the effective address from register 322 is gated via bus 362 to the buffer address register BAR 363 which is in the S-unit of FIG. 5. The register 363 is latched under typical operations at time C3. The latching of data at time C3 is effective to address the high-speed (HSB) 355. During the buffering segment IB2 the addressed information is accessed from the buffer 355 and is latched under typical operations in the instruction word IW register 388 at time C4. The control signal lines (not specifically shown) are output from the sequencer 325 to the circuits of FIG. 4 in a conventional manner.

At time C4, the data is introduced into the pipeline 350. Pipeline 350 includes the register and control stages 301, 302, 303, 304, 305, and 306. The stages 301, 302 and 303 each are active for two segments. Those stages each store pipeline information and generate control signals during two cycles of the data processing system for each instruction. The stages 304, 305, and 306 are each active for one segment and each stores pipeline information and generates control signals during one cycle of the data processing system for each instruction.

The instruction pipeline 350 in FIG. 3 includes registers for storing the pipeline information in each of the stages 301 through 305. The first stage 301 is latched at time C6 after the decoding of the D segment and the reading of the R segment. The D segment is active for the cycle from clock pulse C4 to clock pulse C5 and the R segment for the cycle between pulses C5 and C6. The D and R segments use the information stored in the IB register 330 of FIG. 3 or IW register 388 of FIG. 5. The data is latched into the registers 330 or 338 at the clock pulse time C4 and remains there until transferred and latched in the stage 301 register at C6. The stage 302 associated with the segments OA and OB1 includes a register which is latched at clock period C8 with the same information shifted out from the register of stage 301.

Similarly, stage 303 receives information from the register in the stage 302 and is operative over the clock periods from C8 to C10. At time C10, the information in the pipeline received from stage 302 is latched in the register in stage 303. During two clock periods from C8 to C10, the segments OB2 and E1 of the instruction stream are active to develop control signals for the system. After being latched at time C10 in the stage 303 register, the pipeline information is employed in the performance of the E2 segment for the period from C10 to C11 and is latched in the register of stage 304 at time C11. The information latched in the register of stage 304 is employed for the period from C11 to C12 to generate control signals to perform the check segment of the instruction sequence. At clock pulse C12, the stage 304 information segment becomes latched in the register of stage 305. Finally, information in the register of the stage 305 is used during the W segment, during the period from C12 to C13 to generate control signals for writing information. Thereafter, the information in the pipeline 350 is discarded and is no longer retained.

In FIG. 4, the I-unit control 308 has the input/output lines 541 including the STATE lines 528, the I VAL line 545, and the I COM line 544, and the CON START line. Control 308 receives the console command bus 540, CCB (0-7.) Additional details of the control 308 are shown in FIG. 9.

In FIG. 4, the console address bus 542, CAB (0, . . . ,31) is connected as an input to the K register 312. The register is loaded with data from bus 542 by the LD K signal. The selection circuit 343 receives the console data bus 543, CDB (0, . . . 31), which enables the selection of the data registers 554 and 555, FIG. 3, for transmitting their contents into the IR register 342 of the I-unit 8 of FIG. 4 whenever SEL CDB and LD 1R are enabled.

In FIG. 4, the D segment of stage 301 receives the φVAL line to enable latching of data. Additionally, the D segment includes conventional logic for decoding the diagnose instruction which has a Hex value of 83EBXXXX. When an instruction is latched in D by φA VAL, if the instruction is DIAGNOSE, the DIAG line is set to 1. The DIAG line then causes latch 757 to be set. The 0 from 757Q* causes the output from AND gate 786 in FIG. 9 to be 0. That 0 causes φA VAL from gate 787 to be 0 which thus inhibits any further inputs to be D register and hence prohibits any further instructions from being entered into the pipeline 350 due to normal processing. The diagnose instruction is then propagated down the pipeline unitl it reaches the CK stage where it is decoded to provide a STOP DEC signal as the output from C12 to C13. The occurrence of the STOP DEC output functions to generate the STOP STATE signal by setting latch 755 in FIG. 9. When the STOP STATE signal is generated, it enables the console select (CON SEL) portion of the selection circuitry 332 thereby selecting console command bus 540, CCB (8-15), as the input to pipeline 350.

In FIG. 4, when CCB (8-15) having a Hex value C0 (specifying a STORE STORAGE instruction) is latched into the R segment, that instruction is decoded at the C6 time. The R segment includes a conventional decoder which provides the LDK signal for loading the CAB (0, . . . 31) bus 543 into the K register 312. The R segment is also operative in a conventional manner or in response to a STORE STORAGE code and C6 to cause a storage request to the S-unit of FIG. 5. The selection of the K register contents into the effective address adder 318 for entry into register 322 is under control of the OA segment of stage 302. The OA segment includes a conventional decoder for recognizing the C0 code and responsively generating the SEL K signal and the LD EAR signal. At the end of the phase A, the OA END signal occurs at C7, the contents of CAB (σ, . . . , 31) are latched into the effective address register 322.

The segment OB2 between times C8 and C9 decodes C0, generating SEL CDB and thereby causing the console data bus 543 to be selected by selection circuitry 343 onto bus ROB3 as an input to the 1R register 342. At C9 time, OB2 decodes C0 to form LD1R so that the 1R register is loaded with the console data bus 543 information.

During the E1 and E2 phases the data from the 1R register is loaded by the S-unit into the address specified in the EAR register 322. In the CK segment, conventional logic is present which decodes 83EB to generate a DIAG signal between C12 and C13. Also, in response to any instruction, logic is present in the CK segment to generate an OP END signal between C12 and C13.

Storage Control Unit

The storage (S) control unit 4 in FIG. 5 includes a buffer 355 for storing information which can be accessed at comparatively high speed. The buffer is addressed by the address in the buffer address register (BAR) 363 which is loaded by input bus 362 from the effective address register (EAR) 322 in the I-unit of FIG. 3. The information locations accessed in buffer 355 result in the fetching or storing of the corresponding information from or to main store (MS), the E-unit, the C-unit, or the I-unit. Communication to main store is via buses 351 which are connected as the inputs and outputs of the main store data (MSD) register 384. Each of the buses 351 is eight bytes (64 bits) wide as is the register 384. Register 384 also has inputs of four bytes from the primary high-speed buffer (PHB) 367 and the alternate high-speed buffer (AHSB) 368. The register 384 has a four byte output which is connected to the storage data (SD) register 385 which in turn has a four byte output connected as an input to the buffer stores 367 and 368. The communication from main store 2 of FIG. 1 to the storage control unit 4 is on an eight byte basis while communication between the storage control unit 4 and the E-unit to S-unit communication is carried out over the input bus 352 from the E-unit which is connected to the storage data select gates 386 for storage in the four byte SD register 385.

Communication between the S-unit 4 and the E-unit 10 of FIG. 1 is via the input buses 352 through the store data select gates 386 for storing data in the storage data (SD) register 385 in the S-unit 4. Data output to the E-unit 10 is via the bus 395 which is also four bytes wide. Communication between the C-unit 6 and the S-unit 4 in FIG. 1 is via the input bus 353 to the select gates 386 and the output bus 394 both of which are also four bytes wide. Communication between the S-unit 4 and the I-unit 8 of FIG. 1 is via the input addressing bus 362 and the output bus 396, each of which is four bytes wide.

From the above description, it is apparent that the S-unit 4 communicates with main store on the basis of eight byte data transfers while communication with the rest of the data processing system including the I-unit 8, the E-unit 10 and the C-unit 6 is on the basis of four-byte data transfers.

The buffer 355 is addressed by the buffer address register (BAR) 363. The register 363 is loaded with an input from the bus 362 connecting to the effective address register (EAR) in the I-unit of FIG. 3. Additionally, the register 363 is loaded as an output from the S-unit byte adder 361 or from the S-unit line addition adder 360. With the buffer address in register 363, the address is simultaneously gated to the primary buffer address (PBA) unit 365 or the alternate buffer address unit (ABA) 366. The address units 365 and 366 function to decode the higher order bits and select two unique storage locations, one in the primary high-speed buffer (PHSB) and one in the alternate high speed buffer (AHSB) 367 and 368, respectively. The low order bits from the register 363 are gated directly to the buffers 367 and 368. The accessed words from each of the buffers 367 and 368 are gated to the primary data manipulator 370 and the alternate data manipulator 371, respectively. By comparison in the manipulators 370 and 371 with the comparator register 378, either the data from the primary buffer 367 in the manipulator 370 or the data from the alternate buffer 368 in the alternate manipulator 371 is selected. Data manipulators 370 and 371 also function to shift the data to insure proper alignment and otherwise manipulate accessed data for communication to other units within the data processing system. The selected one of the manipulators 370 or 371 gates the accessed information from the buffer 355 to an appropriate one of the registers 388 through 391. When an instruction word is to be gated to the I-unit, it is stored in IW register 388. When an operand word is to be communicated to the E-unit, it is stored in the OW register 389. When a channel word is to be communicated to the channel unit it is stored in the CW register 390. Register 391 is used in connection with error detection information and stores the output from buffer 355. Register 391 is used in combination with error correction circuitry (not shown) for correcting errors in information accessed from buffer 355.

The registers 374 through 378 are used in conjunction with the addressing and address updating of the buffer store. Register 374 is used in connection with the instruction fetch (IF), register 375 is used in conjunction with an operand (OP) fetch. Register 376 is used in conjunction with a channel (CU) fetch. Register 377 is used in conjunction with a prefetch (PF) for identifying the next to be required access of the buffer 355. The comparison register (COMP.) 378 is used in conjunction with the prefetch address stored in the register 377 and in the comparison carried in the data manipulator 371.

The output from the register 374 through 377 is selected by the selection gates 380 for gating into the line address adder 360 which functions to increment the previous address to the next required address or the S byte adder 361 which functions to increment the byte portion of the address. The input from the adders 360 and 361 in combination with the inputs from the I-unit effective address register all function together to from the full address in the buffer address register 363.

Further details concerning the operation of the storage control unit within the data processing system of FIG. 1 are described in U.S. Pat. Nos. 3,858,183, 3,898,624 and 3,902,163.

In FIG. 8, the storage unit console interface control 713 which forms part of the storage unit control 712 of FIG. 6, is shown. Interface control 713 receives the S VALID line from the console interface control of FIG. 7. Control 713 also receives the CLK which is the master clock signal for the system of FIG. 1.

Control 713 also receives 3-bits from the console command bus 540 of FIG. 3, namely the bits CCB4*, CCB5* and CCB6*.

The output from the control 713 is the S-unit complete line S COM which is returned to the console interface control of FIG. 7. The control 713 also produces the LD OS1 line which is operative in FIG. 5 to load the OS-1 register 726 with information from the console data bus (CDB) 543. Control 713 provides the LD OS2 line which operates to load the OS-2 register 727 in FIG. 5 with information from CDB bus 543. Control 713 generates the LD STOP ADDR REG line which is operative to load the stop address register 729 of FIG. 5 with information from bus 543.

The storage unit console interface control 713 functions under control of conventional set/reset latches 714A and 714B in combination with a plurality of conventional gates. The operation of and the interconnection of the gates and latches in control 713 is described in connection with the following CHART 1.

CHART I

| Time | CLK | S VALID | 714 A Q* | 714 B Q* | 719 | S COM |
|------|-----|---------|----------|----------|-----|-------|
| t1   | 0   | 0       | 1        | 1        | 1   | 0     |
| t2   | 1   | 0       | 1        | 1        | 1   | 0     |
| t3   | 0   | 1       | 1        | 1        | 1   | 0     |
| t4   | 1   | 1       | 1        | 0        | 1   | 0     |
| t5   | 0   | 1       | 1        | 0        | 1   | 0     |
| t6   | 1   | 1       | 0        | 0        | 0   | 0     |
| t7   | 0   | 1       | 0        | 0        | 0   | 0     |
| t8   | 1   | 0       | 0        | 1        | 1   | 1     |
| t9   | 0   | 0       | 0        | 1        | 1   | 1     |
| t10  | 1   | 0       | 1        | 1        | 1   | 0     |
| t11  | 0   | 0       | 1        | 1        | 1   | 0     |
| t12  | 1   | 0       | 1        | 1        | 1   | 0     |

In CHART I the column TIME corresponds to 12 successive system clock pulse transitions on the CLK line. The S VALID column corresponds to the input line from FIG. 7 and the S COM column corresponds to the output line to FIG. 7. The column 714AQ* corresponds to the Q* output of the latch 714A. The 714BQ* output corresponds to the Q* output of latch 714B. The column 719 corresponds to the output from the OR gate 719.

In CHART I, the time t1, it has been assumed that S VALID has been 0 for some time past. With S VALID 0, that signal is connected to the reset (R) input of latch 714A causing 714AQ* to be 1. At the same time, the 0 on S VALID is inverted in gate 717 to produce a 1 input to NOR gate 716. The 1 input to gate 716 forces a 0 output to the set (S) input of latch 714B. Accordingly, the flip-flop 714B is clocked to have a 1 on the 714BQ* output. With 714AQ* and 714BQ* both 1's, the NOR gate 718 produces a 0 output for the S COM signal.

At t2 when CLK goes to 1, S VALID remains a 0 and hence no change occurs in the other signals.

At t3, CLK is 0 and it is assumed that S VALID goes to 1. No change occurs in the other signals of CHART I at this time.

At t4, CLK goes to 1 clocking the latch 714B. The S VALID 1 is inverted in inverter 717 to a 0 so that NOR gate 716 receives the 0 inputs and hence produces a 1 to the set input of latch 714B. Therefore, when latch 714B is clocked at t4, 714BQ* goes to 0.

At t5 there is no change in the signals of CHART I.

At t6, the 0 from 714BQ* and the 0 from inverting gate 717 forces NOR gate 715 to have a 1 output. That 1, connected to the S input of latch 714A is clocked causing 714AQ* to go to 0. With 714BQ* and 714AQ* both 0, the output from OR gate 719 is 0. The 0 from gate 719 at t6 enables all of the NOR gates 720, 721 and 722. If at this time, any of the bits CCB5*, CCB6*, or CCB4* are enabled with a 0, then the corresponding outputs LD OS1, LD OS2, and LD STOP ADDR REG, respectively, are enables with a 1. If one of the outputs LD OS1, LD OS2, or LD STOP ADDR REG is a 1, gate 723 causes a 0 on R input of latch 714B.

At t7, the CLK signal goes to 0 and there is no other change in the signals of CHART I.

At t8, the latch 714BQ* output becomes a 1, and the output of gate 724 becomes 0. The combination of the output from gate 724 being 0 and latch 714AQ* output being 0 produces a 1 output for S COM from gate 718. The 1 output from S COM is received by the CIC circuit 570 of FIG. 7 causing latch 701B to be set resulting in S VAL becoming 0.

At t9, the CLK signal changes, but no other change occurs in CHART I.

At t10 the 0 on S VAL causes latch 714AQ* to become 1. The 1 from 714AQ* is detected by NOR gate 718 to produce a 0 on S COM.

No change occurs at t11 and t12 and the control 713 remains in the same state as existed at time t1 and t2.

By way of summary, the storage unit console interface control 713 of FIG. 8 functions in response to a S VALID signal to become ready to accept commands on the console command bus 540. Those commands are actually accepted during the clocked times t6 and t7 of CHART I. Thereafter, the storage unit console interface control 713 signals completion of receipt of those commands by providing the S COM signal during times t8 and t9. During times t6 and t7, the appropriately commanded load signals cause operations to occur in the storage unit of FIG. 5. cl Console Unit The C unit of FIG. 6 is described in the above cross-referenced application Data Processing System And Floating Channels. Additionally, the C VALID Line of bus 545 from the CCI 525 connects to the command latch register 450 in the channel control logic CCL 403 in the channel unit 6. A signal on the line 545 is operative to initiate the register 450 to enable data on console command bus 540 to be latched into the register 450. The data on bus 540 is derived from the command register 551 in the interface unit 525 of FIG. 3. When the data on bits 540 has been latched into the register 450, the C COM signal of bus 544 is transmitted back to the interface unit 525 as an input to the console interface control 570. The command latch register 450 has an output bus 455 which functions to select various control functions associated with the operation of the channel unit 6.

Specifically, bit 0 when energized is input to a register accessing circuitry 452 which initiates access to the registers of the C-unit 6. Bit 2, is input to the STATE store and particularly into the shifting channel state 15 store. Bit 3 when energized is input to the IPL mode circuitry 453 which is operative to initiate the channel for an initial program load. Bits 4, 5 and 6 when energized are input to the C clock circuitry 454 for energizing the clock signals which control the timing of the channel unit 6. Bits 7, 8 and 9 are input to the registers 404 and bit 10 is input to the local channel stores 406 which bits 11 and 12 are input to the sub channel store 408.

The interaction of the C unit of FIG. 6 with the console is analogous to that of the I-unit and the S-unit.

Instruction Unit Console Interface Control

In FIG. 9, the instruction unit console interface control, which is part of the I-unit control 308 of FIG. 4, is shown. The control of FIG. 9, includes the state latches 751, 752, 753 and 754. Additionally, the stop latch 755, the start latch 756 and the diagnose latch 757 are included. The I-unit interface control of FIG. 9 receives inputs from and delivers output to the console control interface 725 of FIG. 3. Additionally, the control of FIG. 9 receives signals from an output signal to remainder of the I-unit circuitry of FIG. 4.

The operation of and the interconnection of the various gates in FIG. 9 will be described in connection with the following CHART II.

CHART II

| Time | CLK | I VAL | I COM | LAQ | LBQ | LCQ | LDQ | PROC VAL | $\phi$A END | STOP STATE | OP END |
|---|---|---|---|---|---|---|---|---|---|---|---|
| t1 | 0 | 0 | 0 | 0 | 0 | 0 | 0 | 0 | 0 | 1 | 0 |
| t2 | 1 | 0 | 0 | 0 | 0 | 0 | 0 | 0 | 0 | 1 | 0 |
| t3 | 0 | 0 | 0 | 0 | 0 | 0 | 0 | 0 | 0 | 1 | 0 |
| t4 | 1 | 1 | 0 | 0 | 1 | 0 | 0 | 0 | 0 | 1 | 0 |
| t5 | 0 | 1 | 0 | 0 | 1 | 0 | 0 | 0 | 0 | 1 | 0 |
| t6 | 1 | 1 | 0 | 1 | 1 | 0 | 0 | 0 | 0 | 1 | 0 |
| t7 | 0 | 1 | 0 | 1 | 1 | 0 | 0 | 0 | 0 | 1 | 0 |
| t8 | 1 | 1 | 0 | 1 | 1 | 0 | 1 | 1 | 0 | 1 | 0 |
| t9 | 0 | 1 | 0 | 1 | 1 | 0 | 1 | 1 | 0 | 1 | 0 |
| t10 | 1 | 1 | 0 | 1 | 1 | 0 | 1 | 1 | 0 | 1 | 0 |
| t11 | 0 | 1 | 0 | 1 | 1 | 0 | 1 | 1 | 1 | 1 | 0 |
| t12 | 1 | 1 | 0 | 1 | 1 | 1 | 1 | 0 | 0 | 1 | 0 |
| t13 | 0 | 1 | 0 | 1 | 1 | 1 | 1 | 0 | 0 | 1 | 0 |
| t14 | 1 | 1 | 0 | 1 | 1 | 1 | 1 | 0 | 0 | 1 | 0 |
| t15 | 0 | 1 | 0 | 1 | 1 | 1 | 1 | 0 | 0 | 1 | 0 |
| t16 | 1 | 1 | 0 | 1 | 1 | 1 | 1 | 0 | 0 | 1 | 1 |
| t17 | 0 | 1 | 0 | 1 | 1 | 1 | 1 | 0 | 0 | 1 | 1 |
| t18 | 1 | 1 | 0 | 1 | 1 | 1 | 0 | 0 | 0 | 1 | 0 |
| t19 | 0 | 1 | 0 | 1 | 1 | 1 | 0 | 0 | 0 | 1 | 0 |

CHART II-continued

| Time | CLK | I VAL | I COM | LAQ | LBQ | LCQ | LDQ | PROC VAL | φA END | STOP STATE | OP END |
|------|-----|-------|-------|-----|-----|-----|-----|----------|--------|------------|--------|
| t20  | 1   | 1/ 0/1| 1     | 0   | 1   | 0   | 0   | 0        | 1      | 0          |        |
| t21  | 0   | 1/0   | 1/0   | 1/0 | 0   | 1   | 0   | 0        | 0      | 1          | 0      |
| t22  | 1   | 0     | 0     | 0   | 0   | 0   | 0   | 0        | 0      | 1          | 0      |
| t23  | 0   | 0     | 0     | 0   | 0   | 0   | 0   | 0        | 0      | 1          | 0      |
| t24  | 1   | 0     | 0     | 0   | 0   | 0   | 0   | 0        | 0      | 1          | 0      |

In CHART II, the TIME column designates clock transitions from t1 through t24 with a break occurring between t13 and t14. The I VAL column designates the signal having the same name which indicates that a command is being issued from the console to the I unit and which is transmitted from the circuit of FIG. 7 to the FIG. 9 circuit. The I COM column designates the line which connects from the FIG. 9 circuit as a return to the FIG. 7 circuit to indicate when a console initiated command has been completed. The columns LAQ, LBQ, LCQ and LDQ designate the Q outputs of the latches 751 through 754, respectively. The PROC VAL column designates the signal level of the output of NOR gate 780 in FIG. 9. The φA END column designates the decoded output from the R segment of the stage 301 of the pipeline 350 in the instruction unit of FIG. 4.

The STOP STATE column signifies the level of the Q output of the STOP latch 755 of FIG. 9. The OP END column signifies the state of the line which is output from the CK stage 305 of the pipeline 350 of the instruction unit of FIG. 4 for indicating when the end of a pipeline operation has occurred.

The operation of the FIG. 9 circuitry, as it applies to the present invention, commences at a time t1 when all of the indicated levels in CHART II are 0 except for the stop state which is a 1. Under these conditions the principal data processing machine is left in the stop state. The machine is placed in the stop state by setting the STOP latch 755 to a 1. That operation can occur, for example, by the STOP DEC signal which is decoded as a result of specific instructions (e.g. DIAGNOSE) in the CK stage 305 of the pipeline 350 of FIG. 4.

Alternatively, the data processing system of FIG. 1 can be put in the stop state by operation of a command from the console computer 501 of FIG. 2 via the CCB bus 540, the NOR gate 776 and the OR gate 778. It has been assumed, for purposes of CHART II that the latch 755 was set to place the data processing in the stop state as indicated at t1 of CHART II.

At time t2, no change has occurred except in the clock signal. At time t3, an I VAL signal is received from the console interface control 570 of FIG. 7. This signal signifies that a command is to be transmitted from the console to the principal data processing system and particularly to the I unit of FIG. 4. No other change occurs in CHART II.

At t4, the I VAL signal is inverted in gate 774 to a 0 as an input to NOR gate 772. NOR gate 772 also receives a 0 from NOR gate 785 so that gates 772 provides a 1 input to the set (S) input of the LB latch 752. Therefore at t4 time, LBQ is clocked to a 1. No other changes occur in CHART II at t4.

At the t5 clock change, no other changes occur in the chart.

At t6, the LBQ* output (switched to a 0 at t5) provides a 0 input to NOR gate 775. The φ from gate 774 is also provided to NOR gate 775 so that a 1 is produced at the S input of LA latch 751. Therefore latch 751 is switched to a 1 at t6. No other changes occur in CHART II at t6 or during the next clock transition at t7.

After t7, the timing of CHART II is the same as the timing is pipeline 350 of FIG. 4 commencing at C4 time. The C4 clock period is represented by t8 and t9 of CHART II.

At t8, the LAQ* output and the LBQ* output are both 0. Those 0's are propagated through the OR gate 783 to provide a 0 input to the NOR gate 760. The output from gate 783 is a command to strobe the CCB bus 540. The CCB 5* bit from bus 540 is a second input to gate 760. The third input to gate 760 derived from the inverter 781. Since the LCQ* output is a 1, inverted to a 0 in inverter 781, the NOR gate 760 is enabled to receive a 0 command on the CCB5* line. Therefore the output from NOR gate 760 is a 1 which is input to the S input of the LD latch 754. At t8, the latch 754 is clocked to cause LDQ to be 1. Responsively, LDQ* goes to 0 which, together with the 0 on LCQ causes the NOR gate 780 to go to 1. The 1 from gate 780 is propagated through the OR output of gate 787 as the φA VAL signal.

The φA VAL signal connects from FIG. 9 as an enable input to the D segment of the stage 301. The φA VAL signal enables a register in the D segment to be latched with data by the C4 clock pulse. The data which is latched in the segment D is derived from selection circuit 332. The selection is either through the LO SEL, HI SEL or CON SEL. The CON SEL portion of selection circuit 332 selects data from the CCB(8-15) bus 540 from the console control interface 525 of FIG. 3.

During normal processing when the data processing system of FIG. 1 is not in the stop state, the AND gate 786 functions in the absence of a diagnose instruction, to provide an input to OR gate 787 to produce the φA VAL signal allowing instructions to be inserted into the pipeline 350 in a conventionalmanner.

At t9, only a change occurs in the CLK signal.

Times t10 and t11 represent the C5 clock pulse period of segment 301. At t10 no change occurs in the CHART II other than for the CLK signal.

At t11, information introduced into the D segment at C4 is latched into the R segment at C5.

At t11, the φA END signal is generated as an output from the R segment of the stage 301 of the pipeline 350 in FIG. 4. The 1 from the φA END signal is input to NOR gate 765 to provide a 0 on its output. The 0 output from gate 765 together with the 0 from LDQ* satisfies NOR gate 763 to provide a 1 on the S input to the LC latch 753.

At t12, the 1 output from NOR gate 763 is clocked into latch 753 to provide a 1 on LCQ. The 1 on LCQ causes the output of gate 780, PROC VAL, to go to 0. The 0 from gate 780 causes the OR output from gate 787 to go to 0. At t12, the φA END signal returns to 0.

At t13, only the CLK signal of CHART II changes states.

The times t12 and t13 correspond to the C6 clock cycle of the pipeline 350 in FIG. 4. After t13, a break in timing in CHART II is shown which represents the clock times C7, C8 and C9 for stepping instructions through the pipeline 350.

In CHART II, the times t14 and t15 represent the C10 clock period and no change has occured relative to the states at t12 and t13.

At t16 and t17, the C11 clock period, the OP END signal is generated as an output from the CK stage 305 of FIG. 4. In FIG. 9, the 1 input to gate 762 forces its output to a 0.

At t18, the 0 output from gate 762 resets the LD latch 754. At t19, the CLK changes and the remainder of CHART II remains the same.

At t20, the LDQ and LCQ* inputs to NOR gate 782 are both 0. Gate 782 produces a 1 output and therefore forces the output of NOR gate 773 to 0. That 0 from gate 773 causes the LB latch 752 to be reset. That resetting causes a 1 to appear on LBQ*. That 1 is inverted to a 0 in inverter 784. The 0 together with the 0 from LAQ* causes the output from NOR gate 785 to switch to a 1.

In CHART II, the 0/1 indication from I COM signal indicates the non-synchronous switching of the I COM signal with respect to the CLK signal. At some indefinite time thereafter, shown for example at t21 in CHART II, the I VAL signal switches from 1 to 0. The 0 for I VAL is input to reset the LA latch 753. When latch 753 is reset, the LAQ* output goes to 1. That 1 together with the 1 from inverter 784 cause the output of NOR gate 785 to go to 0. Therefore, I COM goes to 0 at t21 in the asynchronous manner indicated in CHART II.

At t22, the LAQ output is 0. That 0 together with a 0 from inverter 771 are detected by NOR gate 767 to produce a 1 input to NOR gate 764. The 1 input to gate 764 causes its output to go to 0 thus resetting LC latch 753.

In FIG. 2, the times t18 and t19 correspond to C12 in the pipeline 350 of FIG. 4, t20 and t21 correspond to C13 in the pipeline, and t22 and t23 correspond to C14 in the pipeline.

Operation

The primary system of FIG. 1 and the primary program of instruction may request the secondary system (computer 501, FIG. 2) and secondary instruction to perform any function which the secondary program is capable of performing. These functions include, but are not limited to:

(1) Altering the control state of the primary apparatus, (2) Causing the execution of commands by the primary apparatus, (3) Controlling data and address lines of the primary apparatus, or (4) Making available to the primary program of instruction scanout information indicating the past internal state of the primary system.

The apparatus which allows requests from the primary program of instructions to the secondary program of instructions is activated by the primary program of instruction using the DIAGNOSE instruction with the Hex format, 83EBX000, where X is a single hexadecimal digit specifying a general purpose register (GPR) within the primary apparatus. The contents of the references GPR is a storage address in the primary apparatus. Starting at this location there is a parameter list of secondary program operations and a data area for inputs to and results from these operations.

The primary apparatus upon execution of an instruction of the format 83EBX000 enters the stop state in the manner previously described. The entering of stop state activates the STOP line 628 in FIG. 9. The stop state signal is available on bit 3 of the active state bus from gate 582 of interface 525 of FIG. 3 and therefore is available to the interface controller 511 of FIG. 3. If the secondary program of instruction has reset bit 3 in the IMR register 579, then DONE is set from gate 583 and the secondary program of instruction is responsively interrupted. The secondary program of instruction then interrogates the primary apparatus to determine the cause of the interruption. This interrogation is done, for example using the scanout facility which is described in the above-identified application Data Processing System and Information Scanout. Upon determination that this interruption was caused by an instruction of the Hex format 83EBX000 within the primary apparatus, the secondary program of instruction uses the scanout facility to determine the value of "X". Then using operations similar to that shown in TABLE II in combination with the scanout facility, the secondary program of instruction retrieves the address of the parameter list specified in general purpose register "X" and fetches the parameter list from the storage area of the primary apparatus. The parameter list is then interpreted by the secondary program of instruction and executed.

A first example described is the case where the parameter list calls for the execution of an operating state register load. In this example, the secondary program of instruction includes the code of the following TABLE I. The code of TABLE I is executed with accumulators 1 and 2 in the secondary system containing values specified by the parameter list which was in turn specified by the primary program of instruction. In the particular case described, the operating state register 726 in FIG. 5 is altered for the purpose of alterning the prefetch algorithm. The prefetch algorithm to be used has been specified by the primary program of instruction.

TABLE I

| S1 | LDOSR: | LDA 0, DRH |
|---|---|---|
| S2 | | DOA 0, CCI1 |
| S3 | | COM 1, 1 |
| S4 | | DOBP 1, CCI1 |
| S5 | | LDA 0, DRL |
| S6 | | DOA 0, CCI1 |
| S7 | | COM 2, 2 |
| S8 | | DOBP 2, CCI1 |
| S9 | | LDA 0, CR |
| S10 | | DOA 0, CCI1 |
| S11 | | LDA 0, CMD |
| S12 | | DOBP 0, CCI1 |
| S13 | | NIOC CCI2 |
| S14 | | LDA 0, SCMD |
| S15 | | DOBP 0, CCI2 |
| S16 | | JMP 0, 3 |
| S17 | DRH: | 030000 |
| S18 | DRL: | 150000 |
| S19 | CR: | 170000 |
| S20 | CMD: | 002000 |
| S21 | SCMD: | 070000 |

The processing of the TABLE I secondary program of instructions employs the S-unit operating state register (OS-1) as described in U.S. Pat. No. 3,898,624 Data Processing With Variable Prefetch And Replacement Algorithms (column 5, lines 11 through 33). In a preferred embodiment, computer 501 in FIG. 2 is a NOVA computer using standard NOVA instruction. A jump subroutine (JSR) is employed to enter the program of TABLE I. The computer jumps to address LDOSR as indicated in statement S1 of TABLE I. Prior to statement S1, accumulator 1 has been loaded with the information destined for operating state register portion OS-1 bits 0 through 15 and accumulator 2 has been loaded with the information destined for operating state register portion OS-1 bits 16 through 31.

In S1 accumulator 0 is loaded with the contents of a fixed address, "DRH" at S17. As indicated at S17, the value is 030000 in octal code.

In S2, the contents of accumulator 0 are transmitted to the interface controller 511 and latched in the SAR 574. Decoder 567 is operative to decode the octal code 030000 to enable via line 621-4 the input gate 548 to the DRH register 554.

In S3, the contents of accumulator 1 are complemented to compensate for a level of inversion between 554 and OSR portion OS-1.

In S4, the contents of accumulator 1 are transmitted to the interface controller 511 and latched in the ODR register 575. Also in S4, a signal is generated on line 549 which energizes the gates 548 which together with signal on line 621-4 latches the 16 bits from the ODR register 575 into the DRH register 554.

In S5 through S8, in a manner similar to S1 through S4, the 16 bits from accumulator 2 are complemented and latched into the DRL register 555.

In S9 through S12, in a manner similar to S1 through S4, the 16 bit contents of a fixed address, "CMD" at S20 (as indicated at S20 the value is 002000 in octal code), are latched into the CR register 551.

In S13, a signal is generated on line 623, Clear CIC, causing the console interface control 570 to de-energize the S, I and C VALID lines 545.

In S14, accumulator 0 is loaded with the value 070000 in octal code from location "SCMD".

In S15, the contents of accumulator 0 are transmitted to the interface controller 511 and latched in the ER 570. Also in S15, a signal is generated on line 622. The combination of ER bit 0 equal to zero and the signal on line 622 (START CIC) causes the CIC to energize the S VALID line on the S, I, C valid bus 545.

The S-unit console control logic is energized by the S VALID line. Two cycles after the receipt of S VALID, the OS-1 register is loaded from the console data bus. Upon completion, the S-unit console control logic causes a signal to be generated on the S COM line of the S, I, C COM bus 544.

The CIC 570, upon detection of the SCOM signal, causes S VALID to be de-energized.

In S16, the program is terminated and the secondary data processing system returns to the return address specified in accumulator 3.

A second example of the present invention is described in connection with the folowing TABLE II.

TABLE II

| | | |
|---|---|---|
| S1 | OP: | |
| S2 | ADDH: | |
| S3 | ADDL: | |
| S4 | DATH: | |
| S5 | DATL: | |
| S6 | XOP: | LDA 0, CR |
| S7 | | DOA 0, CCI1 |
| S8 | | LDA 0, OP |
| S9 | | LDA 1, CMD |
| S10 | | ADD 1, 0 |
| S11 | | DOCP 0, CCI1 |

TABLE II-continued

| | | |
|---|---|---|
| S12 | | LDA 0, ARH |
| S13 | | DOA 0, CCI1 |
| S14 | | LDA 0, ADDH |
| S15 | | DOBP 0, CCI1 |
| S16 | | LDA 0, ARL |
| S17 | | DOA 0, CCI1 |
| S18 | | LDA 0, ADDL |
| S19 | | DOBP 0, CCI1 |
| S20 | | LDA 0, DRH |
| S21 | | DOA 0, 41 |
| S22 | | LDA 0, DATH |
| S23 | | DOCP 0, CCI1 |
| S24 | | LDA 0, DRL |
| S25 | | DOA 0, CCI1 |
| S26 | | LDA 0, DAT 6 |
| S27 | | DOCP 0, CCI1 |
| S28 | | NIOC CCI2 |
| S29 | | LDA 0, ICMD |
| S30 | | DOBP 0, CCI2 |
| S31 | | JMP 0, 3 |
| S32 | CR: | 170000 |
| S33 | CMD: | 002000 |
| S34 | ARH: | 160000 |
| S35 | ARL: | 140000 |
| S36 | DRH: | 030000 |
| S37 | DRL: | 150000 |
| S38 | ICMD: | 130000 |

The processing of the TABLE II secondary program of instructions is described in connection with issuing a command to a portion of the primary computer. That command causes (1) an operation to be performed by the primary computer independent of the primary program, and (2) address and data lines of the primary computer to be controlled by the secondary program of instructions.

A jump subroutine instruction is employed to enter the program of TABLE II. The computer jumps to address "XOP" as indicated in statement s6 of TABLE II. Prior to statement S6, the secondary program of instructions has initialized the fixed locations:

"OP" (statement S1) is initialized with bits 0 through 7=0 and bits 8–15=operation code where the operation code may be any value desired. For this instance of the present invention, the OP is initialized in 300 in octal code, corresponding to a store storage operation in which data from the console data bus 543 is to be stored in the primary computer's memory location specified by the console address bus 542.

"ADDH" (statement S2) is initialized with the value to be placed on the console address bus 542 bits 0–15. For this instance of the present invention, this value is the complement of bits 0–15 of the desired memory address in the primary computer.

"ADDL" (statement S3) is initialized with the value to be placed on the console address bus 542 bits 16–31. For this instance of the present invention, this value is the complement of bits 16–31 of the desired memory address in the primary computer.

"DATH" (statement S4) is initialized with the value to be placed on the console data bus 543 bits 0–15. For this instance of the present invention, this value is the first two bytes of data to be written sequentially starting at the desired memory address in the primary computer.

"DATL" (statement S5) is initialized with the value to placed on the console data bus 543 bits 16–31. For this instance of the present invention this value is the third and fourth bytes of data to be written sequentially starting at the desired memory address in the primary computer.

As the program of TABLE I illustrates, the secondary program has the capability of controlling the control state of the primary computer. Prior to statement S6, the secondary program has caused the primary computer to be stopped suspending the program of instruction in the primary computer. A secondary program like TABLE I is typically inserted in TABLE II to stop the primary system.

In S6, accumulator 0 is loaded with the contents of a fixed address, "CR" at S32. The value is 170000 in octal code.

In S7, the contents of accumulator 0 are transmitted to the interface controller 511 and latched in the SAR 574. Decoder 567 is operative to decode the octal code 170000 to enable via line 621-1 the input gate 548 to the CR register 551.

In S8, accumulator 8 is loaded with the contents of the fixed location "OP" which has previously been initialized to the value 000300 in octal code for this instance of the present invention.

In S9, accumulator 1 is loaded with the contents of the fixed location "CMD" having the value 002000 in octal code.

In S10, accumulator 1 is added to accumulator 0 with the result in accumulator 0. For this instance of the present invention, accumulator 0 takes on the value 002300 in octal code.

In S11, the contents of accumulator 0 are transmitted to the interface controller 511 and latched into the ODR register 575. Also in S11, a signal is generated on line 549 which energizes the gate 548 which together with the signal on line 621-4 latches the 16 bits from the ODR register 575 into the CR register. In this instance of the present invention, the console command bus 540 now has the value 002300 in octal code.

In S12 and S13, the input gate 548 to the ARH register 552 is enabled via line 621-2.

In S14 and S15, the value of the fixed location "ADDH" is placed on the console address bus 542, bits 0–15.

In S16 and S17, the input gate 548 to the ARL register 553 is enabled via line 621-3.

In S18 and S19, the value of the fixed location "ADDL" is placed on the console address bus 542 bits 16–31.

In S20 and S21, the input gate 548 to the DRH register 554 is enabled vial line 621-4.

In S22 and S23, the value of the fixed location "DATH" is placed on the console data bus 543 bits 0–15.

In S24 and S25, the input gate 548 to the DRL register 555 is enabled via line 621-5.

In S26 and S27, the value of the fixed location "DATL" is placed on the console data bus 543 bits 16–31.

In S28 a signal is generated on line 623 "Clear CIC" causing the console interface control 570 to de-energize the S, I, and C valid lines 545.

In S29, accumulator 0 is loaded with the value 150000 in octal code from the fixed location "ICMD" S38.

In S30, the contents of accumulator 0 are transmitted to the interface controller 511 and latched into the ER register 578. Also in S30, a signal is generated on line 622 "Start CIC". The CIC 570 being operative energizes the I VAL line on the S, I, and C valid lines 545.

The I-unit control logic becomes operative upon receipt of the energized I VAL line in the manner previously described.

The I-unit control logic 308 receives CCB(0, . . . , 7) of the console command bus and causes various gating lines to become operative.

(1) In this example of the present invention, the console address bus 542 is latched into the K register 312 and the EAA 318 is caused to gate the K register outputs into the EAR register 372 where the address information is latched. The output of the EAR register is the address bus 362 to the storage unit. This demonstrates the capability of the secondary program running in the secondary processor to control addressing lines within the primary processor.

(2) In this example of the present invention, the console data bus 543 is selected by the multiplexer SEL 343 onto the ROB 3 bus and latched into the IR-REGISTER 342. The output of the IR-REGISTER 342 is the data bus 285 to the E-unit and the data bus 352 to the S-unit. This demonstrates the capability of the secondary program running in the secondary processor to control data lines within the primary processor.

(3) In this example of the present invention, the CCB(8, . . . ,15) of the console command bus are selected through multiplexer 332 into the D segment of the instruction pipeline 350. The OP CODE 300 in octal code is decoded in the pipeline causing the S-unit to store the data from the console data bus in the primary processor memory location specified by the console address bus. This demonstrates the capability of the secondary program running in the secondary processor to cause commands to be performed in the primary processor.

In S31, the secondary program terminates, returning to the location specified in accumulator 3 when the program was entered at S6.

As the program of TABLE I illustrates, the secondary program has the capability of controlling the control states of the primary computer. Subsequent to statement S31 the secondary program of instruction may issue a start processing command to the primary computer, in a manner analogous to TABLE I, in which case the primary program of instruction will then proceed in a normal manner where it is left off when it was entered at S6.

A third example of the present invention is described in connection with the following TABLE III. If the secondary program is to alter the execution of the primary program within the primary computer, data is loaded into the primary computer's memory by the secondary program of TABLE II. The data loaded can be any instruction or set of instructions. If the locations of the primary computer's memory which are altered are in the primary instruction stream, then the result is an alteration of the execution of the primary program of instruction.

A portion of a primary program of instructions is shown in TABLE III. This portion is from Appendix C of the "OS Assembler (F) Programmer's Guide" of the IBM System Reference Library Order No. GC26-3756-7. This portion of the program of instruction implements a binary search of a table with fifteen entries. The program of instruction resides in primary memory starting at location in 5000 in Hexadecimal code, and while it is running, general purpose register 13 contains 5010 in hexadecimal code. This portion resides in primary memory starting at location 50CE in Hexadecimal code and is entered at state S1 with general purpose register 14 containing the return address. The secondary program of instruction alters the primary program of instruction to search only four of the fifteen table locations by altering the contents of primary memory location 50E4 in Hexadecimal code (statement S6). If the secondary program (like TABLE II) causes the primary memory location 50E4 to be loaded with 4760 COE4 in Hexadecimal code; statements S8, S9 and S10 will never be executed. Statements S11 and S12 will be executed whenever LNAME and TNAME do not match. For table entries labeled 1 to 15 this results in only table entries 8, 12, 14 and 15 being searched for a match.

TABLE III

|     |      |       |       |     |        |     |                      |                                          |          |
|-----|------|-------|-------|-----|--------|-----|----------------------|------------------------------------------|----------|
| S1  | 947F | C0BC  |       | 000CC |      | 118 | SEARCH | NI  | SWITCH,255-NONE      | TURN OFF NOT FOUND SWITCH                | 44000019 |
| S2  | 9813 | C39C  |       |       | 003AC | 119 |        | LM  | R1,R3,=F'128,4,128'  | LOAD TABLE PARAMETERS                    | 44500019 |
| S3  | 4111 | C0E0  |       |       | 000F0 | 120 |        | LA  | R1,TABLAREA-16(R1)   | GET ADDRESS OF MIDDLE ENTRY              | 45000019 |
| S4  | 8830 | 0001  |       |       | 00001 | 121 | LOOP   | SRL | R3,1                 | DIVIDE INCREMENT BY 2                    | 45500019 |
| S5  | D507 | 5000  | 1008  | 00000 | 00008 | 122 |        | CLC | LNAME,TNAME          | COMPARE LIST ENTRY WITH TABLE ENTRY      | 46000019 |
| S6  | 4720 | C0E4  |       |       | 000F4 | 123 |        | BH  | HIGHER               | BRANCH IF SHOULD BE HIGHER IN TABLE      | 46500019 |
| S7  | 078E |       |       |       |       | 124 |        | BCR | 8,R14                | EXIT IF FOUND                            | 47000019 |
|     |      |       |       |       |       | 125 |        | SR  | R1,R3                | OTHERWISE IT IS LOWER IN THE TABLE       | X47500019 |
| S8  | 1B13 |       |       |       |       |     |        |     |                      | SO SUBTRACT INCREMENT                    |          |
| S9  | 4620 | C0CA  |       |       | 000DA | 126 |        | BCT | R2,LOOP              | LOOP 4 times                             | 48500019 |
| S10 | 47F0 | C0EA  |       |       | 000FA | 127 |        | B   | NOTFOUND             | ARGUMENT IS NOT IN THE TABLE             | 49000019 |
| S11 | 1A13 |       |       |       |       | 128 | HIGHER | AR  | R1,R3                | ADD INCREMENT                            | 49500019 |
| S12 | 4620 |       |       |       | 000DA | 129 |        | BCT | R2,LOOP              | LOOP 4 TIMES                             | 50000019 |
| S13 | 9680 | C0BC  |       | 000CC |       | 130 | NOTFOUND | OI | SWITCH,NONE         | TURN ON NOT FOUND SWITCH                 | 50500019 |
| S14 | 07FE |       |       |       |       | 131 |        | BR  | R14                  | EXIT                                     | 51000019 |

What is claimed is:
1. A data processing system comprising,
a primary system constructed from a plurality of primary circuits to form a general-purpose programmable computer including primary storage apparatus, primary instruction-handling apparatus and primary instruction-execution apparatus and including means for interconnecting said primary storage apparatus, said primary instruction-handling apparatus and said primary instruction-execution apparatus wherein the primary system processes information by executing a primary program of instructions, said primary program of instructions processed in said primary instruction handling apparatus to cause data manipulations in said execution apparatus and to cause fetching and storing of information from and to said pirmary storage apparatus in connection with the processing of information by the primary system and wherein said instruction handling-apparatus includes selected ones of said primary circuits used for the execution of said primary program in said primary system, said primary system including primary interface control means having primary interface inputs and having connection means for providing circuit outputs from said selected ones of said primary circuits in response to said interface inputs and independently of said primary program, said primary system including channel apparatus connected between said primary storage apparatus and a plurality of I/O controllers where the I/O controllers are connected to input/output devices, and
a secondary system including a programmable secondary computer, said secondary computer operable to process a secondary program of instructions, said secondary system including one of said I/O controllers connected as an input/output device to said secondary computer whereby said secondary computer is connected to said primary system as an input/output device, said secondary system including secondary interface control means connected to said secondary computer and controllable by said secondary program, said secondary interface control means having secondary outputs connected to said primary interface inputs for selecting said selected ones of said primary circuits to access said circuit outputs.

2. A data processing system comprising, a primary system constructed from a plurality of primary circuits to form a general-purpose programmable computer including primary storage apparatus, primary instruction-handling apparatus and primary instruction-execution apparatus and including means for interconnecting said primary storage apparatus, said primary instruction-handling apparatus and said primary instruction-execution apparatus wherein the primary system processes information by executing a primary program of instructions, said primary program of instructions processed in said primary instruction handling apparatus to cause data manipulations in said execution apparatus and to cause fetching and storing of information from and to said pirmary storage apparatus in connection with the processing of information by the primary system and wherein said instruction handling-apparatus includes selected ones of said primary circuits used for the execution of said primary program in said primary system, said primary system including primary interface control means having primary interface inputs and having connection means for providing circuit outputs from said selected ones of said primary circuits in response to said interface inputs and independently of said primary program, said primary system constructed using a plurality of integrated circuit chips each containing a plurality of said primary circuits, said primary system including selection means on each chip for selecting said selected ones of said primary circuits under control of a secondary program and independent of the operation of said primary program in said primary system and including output means on said chips connected to circuit outputs from said selected ones of said primary circuits,
a secondary system including a programmable secondary computer, said secondary computer operable to process said secondary program of instructions, said secondary system including secondary interface control means connected to said secondary computer and controllable by said secondary program, said secondary interface control means having secondary outputs connected to said primary interface inputs for selecting said selected ones of said primary circuits to access said circuit outputs and said secondary interface control means having addressing means connected in response to said secondary program to address said selected ones of said primary circuits through said selection means, and includes scanout means for receiving information, through said output means, from said selected ones of said primary circuits.

3. The apparatus of claim 2 wherein said secondary interface control means includes a scanout address data register connected to receive a scanout address in response to said secondary program and includes scan gates connected to receive information from said scanout means under control of said secondary program.

4. The data processing system of claim 3 further including,
a plurality of chip carriers each containing an associated plurality of said chips and each connected to receive said address bus and connected to provide an input to said scanout means,
means associated with each chip carrier for addressing one of the associated chips in response to information on each address bus,
means on each of said chips responsive to said address bus for addressing a specified one of said selected primary circuits on said chip and for connecting each addressed primary circuit to said scanout means.

5. A data processing system comprising,
a programmable primary system constructed from a plurality of primary circuits wherein the primary system processes information using said primary circuits by executing a primary program of instructions, said primary system including primary interface control means, having primary interface inputs and having connection means for providing circuit outputs from selected ones of said primary circuits in response to said interface inputs and independently of said primary program, said primary system including means for generating an operating signal to indicate the processing and non-processing of instructions in said primary system,
a programmable secondary system including a programmable computer operable to execute a secondary program of instructions, said secondary system including secondary interface control means connected to said secondary computer and controllable by said secondary program, said secondary interface control means having secondary outputs connected to said primary interface inputs for selecting said selected ones of said primary circuits, said secondary interface control means including hang detection means, connected to receive said operating signal, for detecting when instructions in said primary system are not processed, said secondary interface control means including means for signalling said secondary system in response to a detection by said hang detection means whereby said secondary program is interrupted to control said secondary interface control means for selecting said selected ones of said primary circuits.

6. A data processing system comprising, a primary system including a plurality of primary circuits forming a general-purpose programmable computer having primary storage apparatus, primary instruction handling apparatus, and primary instruction execution apparatus wherein the primary system processes information by executing a primary program of instructions, said primary program of instructions processed in said primary instruction handling apparatus to cause execution of data manipulations in said execution apparatus and to cause fetching and storing of information from and to said primary storage apparatus in connection with the processing of information by the primary system wherein said primary instruction handling apparatus includes decoding means for controlling the operation of said primary system and wherein said instruction handling apparatus includes a first group of selected ones of said primary circuits forming selection means for controlling the selection of instructions for entry into said decoding means, said primary system including primary interface control means having primary interface inputs and having connection means for providing circuit inputs to said selected ones of said primary circuits in response to said interface inputs and independently of said primary program, said primary handling apparatus including means for generating an operating signal to indicate the processing and non-processing of instructions in said primary system, a secondary system including a programmable secondary computer, said secondary computer operable to execute a secondary program of instructions, said secondary system including secondary interface control means connected to said secondary computer and controllable by said secondary program, said secondary interface control means including hang detection means, connected to receive said operating signal, for detecting when instructions from said primary system are not processed within a fixed duration; said secondary interface control means including means for signalling said secondary system in response to a detection by said hang detection means whereby said secondary program is interrupted to control said secondary interface control means to control the selection of instructions into said decoding means of said primary system.

7. The data processing system of claim 6 wherein said primary instruction handling apparatus includes a second group of selected ones of said primary circuits forming address means for storing and processing addresses specifying locations within said primary data processing system and wherein said secondary interface control means includes secondary outputs connected to said primary interface inputs and includes means for loading, connected to said secondary outputs and under control of said secondary program, addresses into said address means.

8. The data processing system of claim 6 wherein said primary system includes an additional group of selected ones of said primary circuits forming primary data means for storing data for use in processing by said primary system, and wherein said secondary interface control means includes secondary outputs connected to said primary interface inputs and includes secondary data means, connected to said secondary outputs under control of said secondary program, for entering data into said primary data means under control of said secondary program.

9. The data processing system of claim 6 wherein said primary system includes a still additional group of selected ones of said primary circuits forming primary state means for storing state information for said primary system, and wherein said secondary interface control means includes secondary outputs connected to said primary interface inputs and includes means, connected to said secondary outputs and under control of said secondary program, for loading state information into said primary state means under control of said secondary program.

* * * * *